United States Patent [19]

Roston et al.

[11] Patent Number: 5,754,023
[45] Date of Patent: May 19, 1998

[54] GYRO-STABILIZED PLATFORMS FOR FORCE-FEEDBACK APPLICATIONS

[75] Inventors: Gerald P. Roston, Whitmore Lake; Charles J. Jacobus, Ann Arbor, both of Mich.

[73] Assignee: Cybernet Systems Corporation, Ann Arbor, Mich.

[21] Appl. No.: 736,016

[22] Filed: Oct. 22, 1996

Related U.S. Application Data

[60] Provisional application No. 60/005,861 Oct. 26, 1995.
[51] Int. Cl.⁶ .................... G05B 13/02; B25J 9/00
[52] U.S. Cl. .................. 318/561; 318/568.11; 318/649
[58] Field of Search ......................... 318/561, 567, 318/568.1, 568.11, 566, 628, 648, 649; 414/4, 5

[56] References Cited

U.S. PATENT DOCUMENTS

| | | |
|---|---|---|
| 4,443,952 | 4/1984 | Schulien et al. |
| 5,389,865 | 2/1995 | Jacobus et al. ............... 318/568.11 |
| 5,481,914 | 1/1996 | Ward ........................... 73/504.16 |
| 5,577,981 | 11/1996 | Jarvik ............................. 482/4 |

*Primary Examiner*—Bentsu Ro
*Attorney, Agent, or Firm*—Gifford, Krass, Groh, Sprinkle, Patmore, Anderson & Citkowski

[57] ABSTRACT

Force feedback in large, immersive environments is provided by device which a gyro-stabilization to generate a fixed point of leverage for the requisite forces and/or torques. In one embodiment, one or more orthogonally oriented rotating gyroscopes are used to provide a stable platform to which a force-reflecting device can be mounted, thereby coupling reaction forces to a user without the need for connection to a fixed frame. In one physical realization, a rigid handle or joystick is directly connected to the three-axis stabilized platform and using an inventive control scheme to modulate motor torques so that only the desired forces are felt. In an alternative embodiment, a reaction sphere is used to produce the requisite inertial stabilization. Since the sphere is capable of providing controlled torques about three arbitrary, linearly independent axes, it can be used in place of three reaction wheels to provide three-axis stabilization for a variety of space-based and terrestrial applications.

24 Claims, 14 Drawing Sheets

Spring After Torque Applied
By Accelerating Flywheel

GYRO-STABILIZED PLATFORMS FOR FORCE-FEEDBACK APPLICATIONS

REFERENCE TO RELATED APPLICATIONS

This invention claims priority of U.S. Provisional Application Serial No. 60/005,861, filed Oct. 26, 1995, the entire contents of which are incorporated herein by reference.

FIELD OF THE INVENTION

The present invention relates generally to force feedback and, more particularly, to the use of gyroscopic stabilization to provide an inertial frame against which a force-reflecting device react.

BACKGROUND OF THE INVENTION

Force-feedback technology and related devices may be divided into four broad application areas: medical, entertainment, teleoperations, and virtual reality. Teleoperations, the research of which provided the foundation for the development of force-feedback devices, is the process of locally controlling a remote device. The primary difference between virtual reality and teleoperations is in the objects which they control. With teleoperations, actual physical robots are manipulated in the real world, whereas virtual reality involves simulated devices in synthetic worlds. Force-feedback for telerobotics has evolved large and bulky mechanical arms to more joystick-like designs. In general, these devices are designed for six degree-of-freedom (6DOF) force feedback, and have the capability to provide high levels of force. More recently, finger-operated devices have also been introduced for use in teleoperations applications.

The use of force feedback in medical training, simulation, and teleoperations is also increasing, with the primary application being minimally invasive surgical techniques which use laparscopic tools to perform intricate tasks when inserted into body cavities through small incisions. To realistically simulate laparoscopic tool forces, special-purpose force-feedback devices are currently under development.

The entertainment field is very difficult to address with force-feedback technology, since the applications demand both higher performance and lower costs. There are three primary markets for force feedback devices in entertainment: location-based entertainment (LBE), arcades, and home entertainment. LBE demands the highest performance while home entertainment demands the lowest cost. Despite the conflicting demands, progress is being made in each of these fields.

It may be argued that each of the application domains just described has its roots in virtual reality, which is becoming dominant in all immersive applications. As a consequence, on-going research in immersive applications is often termed "virtual reality," whereas, when the research is completed, the application is given a specific name, such as a surgical simulator. Overall, virtual reality is becoming increasingly popular as a preferred means of interacting with many scientific and engineering applications. To cite two of many examples, molecular modeling and automobile design are moving from standard graphics, carried out on conventional graphics terminals, to more interactive environments utilizing 3-D stereo graphics, head-mounted displays and force feedback.

As visualization is a very important aspect of these applications, interesting and useful technologies are being developed, including graphical object representations and large working volumes (CAVES). Concurrently, haptic interfaces are being perfected, which enable manual interactions with virtual environments or teleoperated remote systems. The haptic system is a unique sensory system in that it can both sense the environment and allow a user to react accordingly. As a result, haptic devices not only stimulate the user with realistic sensor input (forces, tactile sensations, heat, slip, etc.), but also sense the user's actions so that realistic sensory inputs can be generated. Haptic devices are divided into two classes, depending upon the type of sensory information being simulated. The first, tactile, refers to the sense of contact with the object. The second, kinesthetic, refers to the sense of position and motion of a user's limbs along with associated forces.

Broadly, these approaches point toward the same goal: to immerse a person in a seemingly visual reality, complete with haptic feedback. However, a major deficiency with all existing force-generating devices is the requirement that they be connected to a fixed frame, thus forcing immobility on the user. State-of-the-art force-feedback devices, for example, are table mounted, requiring the device to be mounted to an immobile object in order to generate a fixed point of leverage for forces and/or torques. Consequently, no existing force feedback device allows for easy mobility and force generation. This problem is fundamental, since many virtual reality applications require large working volumes and the ability to move freely within these volumes, to provide realistic visual and audio feedback during walk-through scenarios, for example.

In summary, large, immersive environments such as CAVES currently lack haptic feedback, primarily because the existing technology will not support unrestricted motion. This leads to one conclusion that force-feedback devices must migrate as visual technologies have, that is, from the desktop to large-volume, immersive environments. However, the design of a hand-held, spatially unrestricted force-feedback device is fundamentally different from existing devices, which typically use primarily electromechanical or pneumatic actuators operating against fixed supports to achieve active force feedback. Nor is the realization of such a device intuitively obvious. To construct an n-axis joystick, requiring 1, 2, 3 to n+3 motors, presents significant challenges, for example, since the additional motors may significantly increase the cost and/or weight of the device.

SUMMARY OF THE INVENTION

The present invention addresses the need for force feedback in large, immersive environments by providing a device that uses a gyro-stabilization to generate a fixed point of leverage for the requisite forces and/or torques. In one embodiment, one or more orthogonally oriented rotating gyroscopes are used to provide a stable body or platform to which a force-reflecting device can be mounted, thereby coupling reaction forces to the user without the need for connection to a fixed frame. In one embodiment, a user-interactable member is physically coupled to a stabilized body, with the control structure used for stabilization and that used to mitigate force-feedback being substantially independent of one another, enabling different stabilization mechanisms as described herein to be used with existing force-feedback capabilities. In alternative embodiments, inventive apparatus and methods are used which take into account both the movements associated with the gyroscopic stabilization, a user's movements, and the application of torques and forces to realize a spatially unrestricted force-feedback device requiring fewer motors and structural elements. Specifically, an inventive control scheme is used in these cases to accelerate and decelerate the motor(s) associated with providing the gyroscopic stabilization such that only the desired tactile feedback is experienced by the user. All of the various approaches are applicable to single and multiple degrees of freedom.

A three-axis implementation includes a set of three, mutually perpendicular momentum wheels which form the gyro-stabilized platform, an attitude measuring device, and a control system. The attitude measuring device is employed to detect disturbances to the gyro-stabilized platform, including reaction torques due to a user's interactions with the device. The control system varies the speed the momentum wheels in order to maintain the gyro-stabilized platform in a fixed position. In an alternative embodiment, a reaction sphere is used to produce the requisite inertial stabilization. Since the sphere is capable of providing controlled torques about three arbitrary, linearly independent axes, it can be used in place of three reaction wheels to provide three-axis stabilization for a variety of space-based and terrestrial applications.

DETAILED DESCRIPTION OF THE PREFERRED EMBODIMENTS

According to the invention, programmed amounts of rotary force are used for motion compensating and/or the stabilization of free-flying platforms, or to provide force/torque outputs from platforms to attached frames. Specific embodiments are disclosed with respect to spacecraft stabilization, as well as to the application of forces and/or torques to hand-held force generating devices, including joysticks, steering wheels, and implements of arbitrary shape for specific applications, such as sports simulations.

By way of introduction, reaction wheels use the inertia of one or more (typically up to three) rotating flywheels to generate torques. These wheels are typically accelerated using electric motors which can be controlled to increase or decrease rotary speed, thus changing rotational momentum. When the wheel on a particular axis is accelerated through increased motor torque, an equal and opposite reaction torque is generated and applied to the base upon which the wheel is mounted.

Reaction wheels are the most precise type of attitude control mechanism. However, when called upon to provide non-cyclic torques, they must be periodically unloaded by other means (i.e. when the motors have accelerated to maximum RPM in any direction, no additional acceleration can be realized in that direction unless the motors are slowed, generating torques in the opposite direction). Moreover, to provide arbitrary torques, three wheel axes must be provided.

This application describes how reaction wheels as currently only applied only to spacecraft can be extended into several other related terrestrial applications, including gyro-stabilized bodies and tethered, force-generating/reflective input devices. Preliminarily, the following description will demonstrate and how three axes of reaction wheel can be reduced into a single, reaction sphere, useful either in the space-based or terrestrial applications. A description of reaction wheels and spheres will first be presented, followed by a discussion of the extensions to such technology made possible by the invention.

Single Plane of Torque Action

Figure 1:
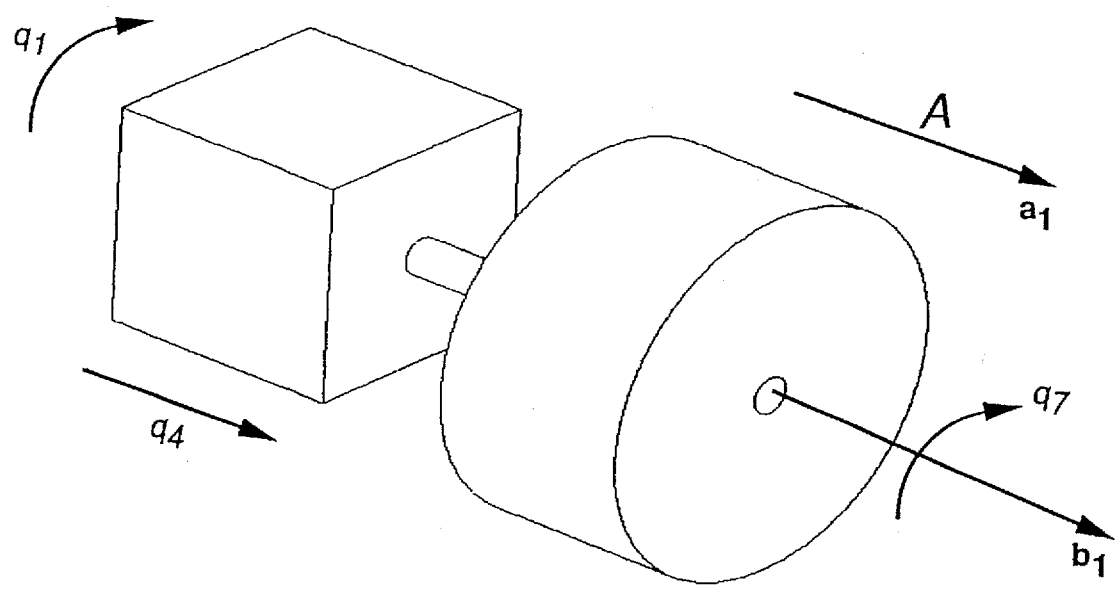
FIG. 1 is a drawing of a one-dimensional space gyroscopic model, as seen from an oblique perspective.

The single plane model for a torquer consists of a spinning wheel attached to a frame. There is a reference frame, B, embedded in the frame and a fixed reference frame, A, in the world. Reference frame B is aligned with the axis of the spinning wheel. The system is shown in FIG. 1.

The reference frame B has two degrees of freedom with respect to reference frame A. These degrees of freedom are described by generalized coordinates $q_1$, $q_4$, where $q_1$ represents the angular degree of freedom about unit vector $a_1$ and $q_4$ represents the linear degree of freedom along unit vector $a_1$. With this model, the unit vectors in frames A and B are related by $$a_1 = b_1. \tag{1}$$

The center of mass of the frame is located at the origin of the B reference frame. The frame is assumed to be a cube with a mass of M and height of R.

The location of the center of mass of the wheel, d, is given by the vector $p^d$, $$^B p^d = l b_1 \tag{2}$$

where l is the offset from the center of the frame (in meters) and is a run-time parameter. The notation $^A v^B$ denotes some vector v in reference frame B with respect to reference frame A. The mass of the (assuming without loss of generality a solid cylindrical disk) wheel is given by $$m = \pi \rho r^2 h \tag{3}$$

where $\rho$ is the density of the material of the wheel, r is the radius of the disk and h is the height of the wheel; and have the units of kg/m³, meters and meters respectively.

The central inertia dyadic of the wheel is given by $$I^{d/d*} = I_2 b_1 b_1 \tag{4}$$

where $$I_2 = \frac{mr^2}{2}. \tag{5}$$

The orientation of the wheel with respect to the frame is given by the generalized coordinates $q_3$. This generalized coordinate is about the $b_1$ axis.

The central inertia dyadic of the frame is given by $$I^{f/f*} = I_6 b_1 b_1 \tag{6}$$

where (assuming without loss of generality that the frame is cubic)

$$I_6 = \frac{MR^2}{6} \tag{7}$$

Since there are two rigid bodies in this model (the frame and the wheel), the angular velocities and accelerations for both must be developed.

The reference frame B is said to have a simple angular velocity in the reference frame A because there exists for all time a unit vector whose orientation in both the reference frame B and reference frame A is independent of time. This allows writing the angular velocity of reference frame B as the magnitude of its angular velocity times the fixed unit vector $$^A \omega^B = \dot{q}_1 b_1. \tag{8}$$

To make the equations of motion concise, a generalized velocity will be defined as $$u_1 = \dot{q}_1. \tag{9}$$

Using the definition in Equation (8), $^A \omega^B$ can be rewritten as $$^A \omega^B = u_1 b_1 \tag{10}$$

The wheel is said to have a simple angular velocity in the reference frame B because there exists for all time a unit vector whose orientation in both the wheel reference frame and reference frame B is independent of time. This allows writing the angular velocity of the wheel as the magnitude of its angular velocity times the fixed unit vector $$^B \omega^d = \dot{q}_7 b_1. \tag{11}$$

The angular velocity of the wheel in reference frame A is given by $$^A \omega^d = (u_1 + \dot{q}_7) b_1. \tag{12}$$

Defining another generalized velocity, $$u_7 = \dot{q}_7 \tag{13}$$

allows expressing Equation (12) in terms of generalized velocities only as $$^A \omega^d = (u_1 + u_7) b_1. \tag{14}$$

The angular acceleration of reference frame B is found to be $$^A \alpha^B = \dot{u}_1 b_1. \tag{15}$$

and the angular acceleration of the wheel can be written as $$^A \alpha^d = (\dot{u}_1 + \dot{u}_7) b_1. \tag{16}$$

The location of reference frame B is given by $$^A p^B = q_4 a_1. \tag{17}$$

The velocity $^A v^B$ and acceleration $^A a^B$ of this frame are found to be $$^A v^B = \dot{q}_4 a_1 \quad ^A a^B = \ddot{q}_4 a_1 \tag{18}$$

since the unit vectors $a_i$ are fixed in reference frame A. Defining a generalized velocity $$u_4 = \dot{q}_4 \tag{19}$$

allows rewriting Equation (18) as $$^A v^B = u_4 a_1 \quad ^A a^B = \dot{u}_4 a_1 \tag{10}$$

By defining the disturbance forces acting at the origin of reference frame B as $$F = f_x a_1, \tag{21}$$

the disturbance torque acting on the frame as $$T_s = \tau_x a_1, \text{ and} \tag{22}$$

and the motor torque, applied to the wheel, as $$T_d = \tau_d b_1 \tag{23}$$

the equations of motion are found to be:

$$\tau_x - ((I_2 + I_6)\ddot{u}_1 + I_2 \ddot{u}_7) = 0$$
$$f_x - (M+m)\ddot{u}_4 = 0$$
$$\tau_d - (I_2 \ddot{u}_1 + I_2 \ddot{u}_7) = 0 \tag{24}$$

Rewriting Equation (24) in matrix form yields $$\begin{bmatrix} (I_2 + I_6) & I_2 \\ I_2 & I_2 \end{bmatrix} \begin{bmatrix} \ddot{u}_1 \\ \ddot{u}_7 \end{bmatrix} = \begin{bmatrix} \tau_x \\ \tau_d \end{bmatrix}. \tag{25}$$

To control this system, an expression for $\tau_d$ that allows the system to move from any value of $\{q_1, u_1\}$ to any other value of $\{q_1, u_1\}$ in the presence of disturbance torques $\tau_x$ must be developed (see Section below). To gain a understanding of the system, first set $\tau_x = 0$. Equation (25) can now be written as $$\tau_d + I_2 \ddot{u}_1 = 0. \tag{26}$$

From control theory, it is known that this equation is not stable since the poles lie on the imaginary axis. Thus, the form of $\tau_d$ required to satisfy stability criteria must meet the following two criteria:

1. It must move the poles of Equation (26) into the left-half plane.
2. It should utilize values of $\{q_1, u_1, q_7, u_7\}$ to control the system as these state variables can be measured.

If the disturbance torque is not set equal to zero, then Equation (26) is rewritten as $$\tau_d + I_2 \ddot{u}_1 = \tau_x \tag{27}$$

and a third requirement for the control torque is added:

3. It must be robust for a specified set of disturbance torque values and functional forms.

Some simple relationships are also developed to suggest appropriate motor parameter values and sizes for the momentum wheels. For real world application, it is important to be able to specify certain aspects of the problem, such as force produced, the period of time for which it is produced and the mass of the device. Also, to stay firmly rooted in reality, it is important to specify the power output of the motor.

Equation (28) shows the basic equations $$I = mr^2 \quad \tau = I\alpha$$
$$\omega = \alpha t \quad P = \tau \omega \tag{28}$$

where I is the moment of inertia of the momentum wheel (assuming that it is a thin hoop; for a solid disk, $I = mr^2/2$ and, in reality, the actual value will fall some place in between), m is the mass of the momentum wheel, r is the radius of the momentum wheel, $\tau$ is the torque applied to the operator (which is the same as the torque produce by the motor), ($\tau$ is the angular acceleration of the momentum wheel, $\omega$ is the angular velocity of the momentum wheel, t is the period of time for which the torque is felt and P is the power output of the motor.

To feel a torque produced by a motor that is not attached to some fixed structure, the motor rotor must be accelerating. The rotor will continue to accelerate until the motor reaches its maximum angular velocity, a value that is determined by motor parameters (but the calculation of which is not important for this analysis). To increase the amount of time during which the torque can be felt, it is necessary to slow down the angular acceleration of the motor by increasing the moment of inertia of the rotor.

Equation (28) has four equations and eight parameters. Of these parameters, an equation is formed that relates m,r,t,$\tau$ and P because these are the parameters that can be controlled during the design of the device. One such form of this equation is $$r = \sqrt{\frac{\tau^2 t}{mP}}. \tag{29}$$

Arbitrary Torque Generation From Wheels

Figure 2:
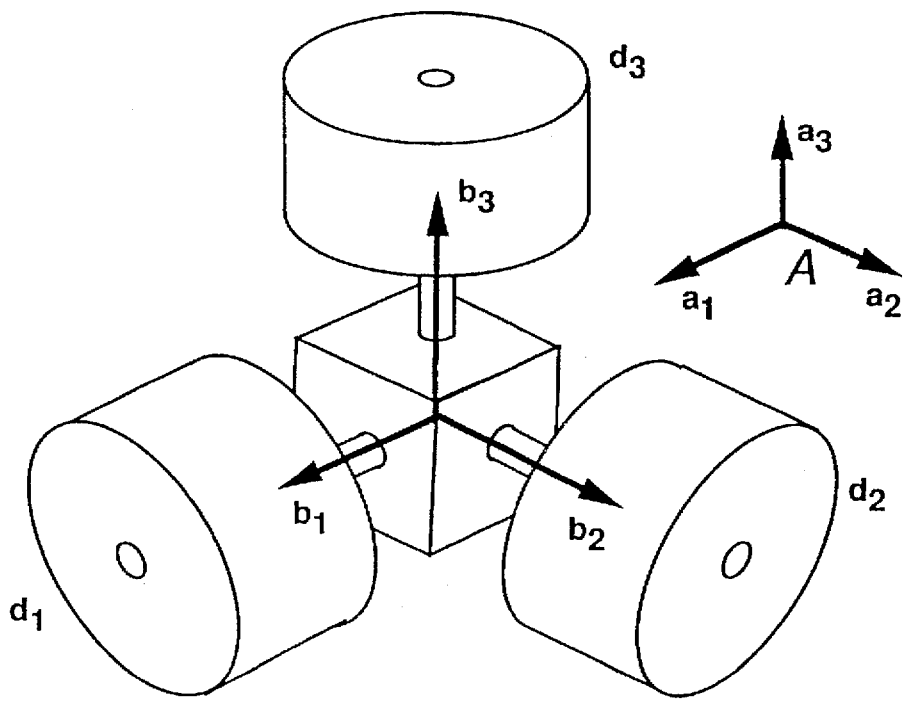
FIG. 2 is a drawing of a three-axis stabilized system model, as seen from an oblique perspective.

To generate arbitrary torques, a 3D platform consisting of three spinning wheels attached to three non-coplanar axes of a frame is required. (For simplicity, and without loss of generality, this work assumes that the axes are mutually perpendicular.) There is a reference frame, B, embedded in the frame and a fixed reference frame, A, in the world. Reference frame B is aligned with the axes of the three spinning wheels, thus defining a set of mutually perpendicular unit vectors. The system is shown in FIG. 2.

The reference frame B has six degrees of freedom with respect to reference frame A. These degrees of freedom are described by generalized coordinates $q_1, \ldots, q_6$, where $q_1, \ldots, q_3$ represent the angular degrees of freedom about unit vectors $a_1, a_2, a_3$ respectively and $q_4, \ldots, q_6$ represent the linear degrees of freedom along unit vectors $a_1, a_2, a_3$ respectively. The orientation of reference frame B with respect to reference frame A is described using a Body 3: 1-2-3 representation. Table 1 shows the relationship between the unit vectors $a_1, a_2, a_3$ and $b_1, b_2, b_3$.

TABLE 1

| | Direction cosines | | |
|---|---|---|---|
| | $b_1$ | $b_2$ | $b_3$ |
| $a_1$ | $c_2 c_3$ | $-c_2 s_3$ | $s_2$ |
| $a_2$ | $s_1 s_2 c_3 + s_3 c_1$ | $-s_1 s_2 s_3 + c_3 c_1$ | $-s_1 c_2$ |
| $a_3$ | $-c_1 s_2 c_3 + s_3 s_1$ | $c_1 s_2 s_3 + c_3 s_1$ | $c_1 c_2$ |

The terms $c_i, s_i$ are defined as $\cos(q_i)$ and $\sin(q_i)$ respectively.

To simplify some expressions, the following terms are defined:

$$Z_1 \equiv c_2 c_3 \quad Z_4 \equiv -c_2 s_3 \quad Z_7 \equiv s_2 \tag{30}$$
$$Z_2 \equiv s_1 s_2 c_3 + s_3 c_1 \quad Z_5 \equiv -s_1 s_2 s_3 + c_3 c_1 \quad Z_8 \equiv -s_1 c_2$$
$$Z_3 \equiv -c_1 s_2 c_3 + s_3 s_1 \quad Z_6 \equiv c_1 s_2 s_3 + c_3 s_1 \quad Z_9 \equiv c_1 c_2$$

Since the equations of motion will be developed using the unit vectors in reference frame B, the unit vectors in reference frame A are explicitly presented using the terms $Z_i$ defined in Equation (30).

$$a_1 = Z_1 b_1 + Z_4 b_2 + Z_7 b_3$$
$$a_2 = Z_2 b_1 + Z_5 b_2 + Z_8 b_3$$
$$a_3 = Z_3 b_1 + Z_6 b_2 + Z_9 b_3 \tag{31}$$

For simplicity, and without loss of generality, the center of mass of the frame is located at the origin of the B reference frame and the frame is assumed to be cubical with a mass of M and height of R.

The central inertia dyadics of the frame is given by $$I^{f/f^*} = I_6 b_1 b_1 + I_6 b_2 b_2 + I_6 b_3 b_3 \tag{32}$$

where $$I_6 = \frac{MR^2}{6} \tag{33}$$

The locations of the center of mass of the wheels, $d_i$, are given by the vectors $p^{d_i}$, where $$^B p^{d_1} = l b_1 \quad ^B p^{d_2} = l b_2 \quad ^B p^{d_3} = l b_3 \tag{34}$$

where l is the offset from the center of the frame (in meters). The mass of each wheel (assuming without loss of generality that each wheel is a solid cylinder) is given by $$m = \pi \rho r^2 h \tag{35}$$

where $\rho$ is the density of the material of the wheel, r is the radius of the fisk and h is the height of the wheel and have the units of kg/m$^3$, meters and meters respectively.

The central inertia dyadics of the wheels are given by $$I^{d_1/d^*_1} = I_2 b_1 b_1 + I_1 b_2 b_2 + I_1 b_3 b_3$$
$$I^{d_2/d^*_2} = I_1 b_1 b_1 + I_2 b_2 b_2 + I_1 b_3 b_3$$
$$I^{d_3/d^*_3} = I_1 b_1 b_1 + I_1 b_2 b_2 + I_2 b_3 b_3 \tag{36}$$

where $$I_1 = \frac{m(3r^2 + h^2)}{12} \quad I_2 = \frac{mr^2}{2} \quad I_3 = I_2 - I_1. \tag{37}$$

The orientation of the wheels with respect to the frame are given by the generalized coordinates $q_7, \ldots, q_9$. These generalized coordinates are about the $b_1, b_2, b_3$ axes respectively.

Since there are four rigid bodies in this model (the frame and the three wheels), the angular velocities and accelerations for all four must be developed.

The angular velocity of the frame, $^A\omega^B$ is found to be $$^A\omega^B = (c_2 c_3 \dot{q}_1 + s_3 \dot{q}_2) b_1 + (-c_2 s_3 \dot{q}_1 + c_3 \dot{q}_2) b_2 + (s_2 \dot{q}_1 + \dot{q}_3) b_3. \tag{38}$$

To make the equations of motion concise, three generalized velocities will be defined as $$u_1 = c_2 c_3 \dot{q}_1 + s_3 \dot{q}_2 \quad u_2 = -c_2 s_3 \dot{q}_1 + c_3 \dot{q}_2 \quad u_3 = s_2 \dot{q}_1 + \dot{q}_3. \tag{39}$$

Using the definition in Equation (39) $^A\omega^B$ can be rewritten as $$^A\omega^B = u_1 b_1 + u_2 b_2 + u_3 b_3 \tag{40}$$

The wheels are said to have a simple angular velocity in the reference frame B because there exists for all time a unit vector whose orientation in both the wheel reference frames and reference frame B is independent of time. This allows writing the angular velocities of the wheels as the magnitude of their angular velocity times the fixed unit vector $$^B\omega^{d_1} = \dot{q}_7 b_1 \quad ^B\omega^{d_2} = \dot{q}_8 b_2 \quad ^B\omega^{d_3} = \dot{q}_9 b_3. \tag{41}$$

The angular velocities of the wheels in reference frame A are given by $$^A\omega^{d_1} = (u_1 + \dot{q}_7) b_1 + u_2 b_2 + u_3 b_3$$
$$^A\omega^{d_2} = u_1 b_1 + (u_2 + \dot{q}_8) b_2 + u_3 b_3.$$
$$^A\omega^{d_3} = u_1 b_1 + u_2 b_2 + (u_3 + \dot{q}_9) b_3 \tag{42}$$

Defining three more generalized velocities, $$u_7 = \dot{q}_7 \quad u_8 = \dot{q}_8 \quad u_9 = \dot{q}_9 \tag{43}$$

allows expressing Equation (42) in terms of generalized velocities only as $$^A\omega^{d_1} = (u_1 + u_7) b_1 + u_2 b_2 + u_3 b_3$$
$$^A\omega^{d_2} = u_1 b_1 + (u_2 + u_8) b_2 + u_3 b_3.$$
$$^A\omega^{d_3} = u_1 b_1 + u_2 b_2 + (u_3 + u_9) b_3 \tag{44}$$

The angular acceleration of reference frame B is found to be $$^A\alpha^B = \dot{u}_1 b_1 + \dot{u}_2 b_2 + \dot{u}_3 b_3. \tag{45}$$

The angular accelerations of the wheels can be written as $$^A\alpha^{d_1} = (\dot{u}_1 + \dot{u}_7) b_1 + (\dot{u}_2 + u_3 u_7) b_2 + (\dot{u}_3 - u_2 u_7) b_3$$
$$^A\alpha^{d_2} = (\dot{u}_1 - u_3 u_8) b_1 + (\dot{u}_2 + \dot{u}_8) b_2 + (\dot{u}_3 + u_1 u_8) b_3$$
$$^A\alpha^{d_3} = (\dot{u}_1 + u_2 u_9) b_1 + (\dot{u}_2 - u_1 u_9) b_2 + (\dot{u}_3 + \dot{u}_9) b_3 \tag{46}$$

The following terms are defined to simplify the equations $$Z_{10} = \dot{u}_1 + \dot{u}_7 \quad Z_{13} = \dot{u}_2 + u_3 u_7 \quad Z_{16} = \dot{u}_3 - u_2 u_7$$
$$Z_{11} = \dot{u}_1 - u_3 u_8 \quad Z_{14} = \dot{u}_2 + \dot{u}_8 \quad Z_{17} = \dot{u}_3 - u_1 u_8,$$
$$Z_{12} = \dot{u}_1 + u_2 u_9 \quad Z_{15} = \dot{u}_2 - u_1 u_9 \quad Z_{18} = \dot{u}_3 + \dot{u}_9 \tag{47}$$

thus allowing Equation (46) to be rewritten as $$^A\alpha^{d_1} = Z_{10} b_1 + Z_{13} b_2 + Z_{16} b_3$$
$$^A\alpha^{d_2} = Z_{11} b_1 + Z_{14} b_2 + Z_{17} b_3$$
$$^A\alpha^{d_3} = Z_{12} b_1 + Z_{15} b_2 + Z_{18} b_3 \tag{48}$$

There are four points of interest in this problem: the location of reference frame B and the locations of the centers of mass for each of the wheels. The location of reference frame B is given by $$^A p^B = q_4 a_1 + q_5 a_2 + q_6 a_3. \tag{49}$$

and its velocity $^A v^B$ and acceleration $^A a^B$ are found to be $$^A v^B = \dot{q}_4 a_1 + \dot{q}_5 a_2 + \dot{q}_6 a_3 \quad ^A a^B = \ddot{q}_4 a_1 + \ddot{q}_5 a_2 + \ddot{q}_6 a_3 \tag{50}$$

since the unit vectors $a_i$ are fixed in reference frame A. Defining generalized velocities $$u_4 = \dot{q}_4 \quad u_5 = \dot{q}_5 \quad u_6 = \dot{q}_6 \qquad (51)$$

allows rewriting Equation (50) as $$^A v^B u_4 a_1 + u_5 a_2 + u_6 a_3 \quad ^A a^B \dot{u}_4 a_1 + \dot{u}_5 a_2 + \dot{u}_6 a_3 \qquad (52)$$

The velocities of the centers of masses of the wheels are found to be $$^A v^{d_1} = {^A v^B} + {^A \omega^B} \times l b_1 = u_4 a_1 + u_5 a_2 + u_6 a_3 + l u_3 b_2 - l u_2 b_3$$

$$^A v^{d_2} = {^A v^B} + {^A \omega^B} \times l b_2 = u_4 a_1 + u_5 a_2 + u_6 a_3 - l u_3 b_1 + l u_1 b_3,$$

$$^A v^{d_3} = {^A v^B} + {^A \omega^B} \times l b_3 = u_4 a_1 + u_5 a_2 + u_6 a_3 + l u_2 b_1 - l u_1 b_2 \qquad (53)$$

and the accelerations of the centers of masses of the wheels are found to be $$^A a^{d_1} = \dot{u}_4 a_1 + \dot{u}_5 a_2 + \dot{u}_6 a_3 - l(u_2^2 + u_3^2) b_1 + l(u_1 u_2 + \dot{u}_3) b_2 + l(u_1 u_3 - \dot{u}_2) b_3$$

$$^A a^{d_2} = \dot{u}_4 a_1 + \dot{u}_5 a_2 + \dot{u}_6 a_3 + l(u_1 u_2 - \dot{u}_2) b_1 + l(u_2 u_3 - \dot{u}_1) b_2 - l(u_1^2 + u_2^2) b_3 \qquad (54)$$

There are three sets of forces acting on this system: the applied disturbance forces and torques applied to reference frame B that represent, the gravity forces acting on the wheel and frame masses and the motor torques applied to the wheels.

The disturbance forces acting at the origin of reference frame B is defined as $$F = f_x a_1 + f_y a_2 + f_z a_3 \qquad (55)$$

the gravity force on the frame is defined as $$G_f = -M g a_3 \qquad (56)$$

or equivalently as $$G_f = -M g(Z_3 b_1 + Z_6 b_2 + Z_9 b_3); \qquad (57)$$

and three gravity forces, which act at the center of the wheels, are defined as $$G_{d_1} = -m g a_3 \quad G_{d_2} = -m g a_3 \quad G_{d_3} = -m g a_3 \qquad (58)$$

or equivalently as $$G_{d_1} = -m g(Z_3 b_1 + Z_6 b_2 + Z_9 b_3)$$

$$G_{d_2} = -m g(Z_3 b_1 + Z_6 b_2 + Z_9 b_3)$$

$$G_{d_3} = -m g(Z_3 b_1 + Z_6 b_2 + Z_9 b_3) \qquad (59)$$

The disturbance torque acting on the frame is defined as $$T_\delta = \tau_x a_1 + \tau_y a_2 + \tau_z a_3 \qquad (60)$$

and the three motor torques are defined as $$T_{d_1} = \tau_{d_1} b_1 \quad T_{d_2} = \tau_{d_2} b_2 \quad T_{d_3} = \tau_{d_3} b_3 \qquad (61)$$

with the positive sense of the torque being applied to the wheel. However, Newton's second law demands that there be an equal and opposite torque applied to the frame, body B. Thus, the resultant acting on body B is given by $$T = \tau_x a_1 + \tau_y a_2 + \tau_z a_3 - \tau_{d_1} b_1 - \tau_{d_2} b_2 - \tau_{d_3} b_3. \qquad (62)$$

The definitions of the generalized inertia forces was facilitated by defining the following terms:

$$Z_{19} = l(u_2^2 + u_3^2) \quad Z_{22} = l(u_1 u_2 + \dot{u}_3) \quad Z_{25} = l(u_1 u_3 - \dot{u}_2) \qquad (63)$$

$$Z_{20} = l(u_1 u_2 - \dot{u}_3) \quad Z_{23} = l(u_1^2 + u_3^2) \quad Z_{26} = l(u_2 u_3 + \dot{u}_1),$$

$$Z_{21} = l(u_1 u_3 + \dot{u}_2) \quad Z_{24} = l(u_2 u_3 - \dot{u}_1) \quad Z_{27} = l(u_1^2 + u_2^2)$$

The equations of motion are found to be:

$$\tau_x Z_1 + \tau_y Z_2 + \tau_z Z_3 + m g l(Z_6 - Z_9) - [(2 I_1 + I_2 + I_6) \dot{u}_1 + I_2 \dot{u}_7 + I_2(u_2 u_9 - u_3 u_8)] +$$
$$m l[(Z_4 - Z_7) \dot{u}_4 + (Z_5 - Z_8) \dot{u}_5 + (Z_6 - Z_9) \dot{u}_6 - 2 l \dot{u}_1] = 0$$

$$\tau_x Z_4 + \tau_y Z_5 + \tau_z Z_6 + m g l(Z_9 - Z_3) - [(2 I_1 + I_2 + I_6) \dot{u}_2 + I_2 \dot{u}_8 + I_2(u_3 u_7 - u_1 u_9)] +$$
$$m l[(Z_7 - Z_1) \dot{u}_4 + (Z_8 - Z_2) \dot{u}_5 + (Z_9 - Z_3) \dot{u}_6 - 2 l \dot{u}_2] = 0$$

$$\tau_x Z_7 + \tau_y Z_8 + \tau_z Z_9 + m g l(Z_3 - Z_6) - [(2 I_1 + I_2 + I_6) \dot{u}_3 + I_2 \dot{u}_9 + I_2(u_1 u_8 - u_2 u_7)] + m l$$
$$[(Z_1 - Z_4) \dot{u}_4 + (Z_2 - Z_5) \dot{u}_5 + (Z_3 - Z_6) \dot{u}_6 - 2 l \dot{u}_3] = 0 \qquad (64)$$

$$f_x - m(3 \dot{u}_4 + (-Z_{19} + Z_{20} + Z_{21}) Z_1 + (Z_{22} - Z_{23} + Z_{24}) Z_4 + (Z_{25} + Z_{26} - Z_{27}) Z_7) -$$
$$M \dot{u}_4 = 0$$

$$f_y - m(3 \dot{u}_5 + (-Z_{19} + Z_{20} + Z_{21}) Z_2 + (Z_{22} - Z_{23} + Z_{24}) Z_5 + (Z_{25} + Z_{26} - Z_{27}) Z_8) -$$
$$M \dot{u}_5 = 0$$

$$f_z - m(3 g + 3 \dot{u}_6 + (-Z_{19} + Z_{20} Z_{21}) Z_3 + (Z_{22} - Z_{23} + Z_{24}) Z_6 + (Z_{25} + Z_{26} - Z_{27}) Z_9) - M \dot{u}_6 = 0$$

$$\tau_{d_1} - I_2 Z_{10} = 0$$

$$\tau_{d_2} - I_2 Z_{14} = 0$$

$$\tau_{d_3} - I_2 Z_{18} = 0$$

Since there are nine generalized coordinates, there are 18 equations of motion, nine kinematics and nine dynamic. To solve these equations numerically, they must be written in the form $$\dot{y} = f(y) \qquad (65)$$

where the state vector y has the form $y = \{q_1, \ldots, q_n, u_1, \ldots, u_n\}$. This necessitates rewriting Equation (39) to solve for the $\dot{q}_i$ in terms of the $u_i$. The nine kinematic equations of motion can now be written as $$\dot{q}_1 = (u_1 c_3 - u_2 s_3)/c_2 \quad \dot{q}_2 = u_1 s_3 + u_2 c_3 \quad \dot{q}_3 = (-u_1 c_3 + u_2 s_3)/c_2 + u_3 \qquad (66)$$

$$\dot{q}_4 = u_4 \quad \dot{q}_5 = u_5 \quad \dot{q}_6 = u_6$$

$$\dot{q}_7 = u_7 \quad \dot{q}_8 = u_8 \quad \dot{q}_9 = u_9$$

To write the dynamical equations of motion in the same manner, Equation (64) must be solved for the $\dot{u}_i$. Since several of the $Z_i$ include $\dot{u}_i$, these terms will need to be expanded. As a first step, the following terms are defined $$Z_{28} = u_1 u_2 \quad Z_{29} = u_1 u_3 \quad Z_{30} = u_2 u_3 \qquad (67)$$

$$K_1 = I_2(u_2 u_9 - u_3 u_8) - m l g(Z_6 - Z_9) - \tau_x Z_1 - \tau_y Z_2 - \tau_z Z_3$$

$$K_2 = I_2(u_3 u_7 - u_1 u_9) - m l g(Z_9 - Z_3) - \tau_x Z_4 - \tau_y Z_5 - \tau_z Z_6$$

$$K_3 = I_2(u_1 u_8 - u_2 u_7) - m l g(Z_3 - Z_6) - \tau_x Z_7 - \tau_y Z_8 - \tau_z Z_9 \qquad (68)$$

$$K_4 = m(l(Z_{28} + Z_{29}) - Z_{19}) Z_1 + (l(Z_{28} + Z_{30}) - Z_{23}) Z_4 + (l(Z_{29} + Z_{30}) - Z_{27}) Z_7) - f_x$$

$K_5 = m((l(Z_{28}+Z_{29})-Z_{19})Z_2 + (l(Z_{28}+Z_{30})-Z_{23})Z_5 + (l(Z_{29}+Z_{30})-Z_{27})Z_8) - f_y$ $K_6 = m(3g + (l(Z_{28}+Z_{29})-Z_{19})Z_3 + (l(Z_{28}+Z_{30})-Z_{23})Z_6 + (l(Z_{29}+Z_{30})-Z_{27})Z_9) - f_z$ $K_7 = -\tau_{d_1} \quad K_8 = -\tau_{d_2} \quad K_9 = -\tau_{d_3}$ Next, Equation (64) is rewritten in the form $A\dot{u}_i = K_i$, thus providing a means for solving for the $\dot{u}_i$. $K_i$ is given in Equation (68) and A is defined as $$A = \begin{bmatrix} -(I_4+2ml^2) & 0 & 0 & ml(Z_4-Z_7) & ml(Z_5-Z_8) & ml(Z_6-Z_9) & -I_2 & 0 & 0 \\ 0 & -(I_4+2ml^2) & 0 & ml(Z_7-Z_1) & ml(Z_8-Z_2) & ml(Z_9-Z_3) & 0 & -I_2 & 0 \\ 0 & 0 & -(I_4+2ml^2) & ml(Z_1-Z_4) & ml(Z_2-Z_5) & ml(Z_3-Z_6) & 0 & 0 & -I_2 \\ ml(Z_4-Z_7) & ml(Z_7-Z_1) & ml(Z_1-Z_4) & -(3m+M) & 0 & 0 & 0 & 0 & 0 \\ ml(Z_5-Z_8) & ml(Z_8-Z_2) & ml(Z_2-Z_5) & 0 & -(3m+M) & 0 & 0 & 0 & 0 \\ ml(Z_6-Z_9) & ml(Z_9-Z_3) & ml(Z_3-Z_6) & 0 & 0 & -(3m+M) & 0 & 0 & 0 \\ -I_2 & 0 & 0 & 0 & 0 & 0 & -I_2 & 0 & 0 \\ 0 & -I_2 & 0 & 0 & 0 & 0 & 0 & -I_2 & 0 \\ 0 & 0 & -I_2 & 0 & 0 & 0 & 0 & 0 & -I_2 \end{bmatrix} \quad (69)$$

where $I_4 = 2I_1 + I_2 + I_6$.

A discussion of the control system is presented in below. To simplify the equations of motion to facilitate control development, those terms and equations that deal with the linear position/force are eliminated because a gyro-stabilized platform can only counteract torques, not forces. Rewriting Equation (69) as indicated yields $$\begin{bmatrix} -(I_4+2ml^2) & 0 & 0 & -I_2 & 0 & 0 \\ 0 & -(I_4+2ml^2) & 0 & 0 & -I_2 & 0 \\ 0 & 0 & -(I_4+2ml^2) & 0 & 0 & -I_2 \\ -I_2 & 0 & 0 & -I_2 & 0 & 0 \\ 0 & -I_2 & 0 & 0 & -I_2 & 0 \\ 0 & 0 & -I_2 & 0 & 0 & -I_2 \end{bmatrix} \begin{bmatrix} \dot{u}_1 \\ \dot{u}_2 \\ \dot{u}_3 \\ \dot{u}_7 \\ \dot{u}_8 \\ \dot{u}_9 \end{bmatrix} = \begin{bmatrix} K_1 \\ K_2 \\ K_3 \\ -\tau_{d_1} \\ -\tau_{d_2} \\ -\tau_{d_3} \end{bmatrix} \quad (70)$$

This equation can also be rewritten to explicitly express $\dot{u}_i$ $$\begin{bmatrix} \dot{u}_1 \\ \dot{u}_2 \\ \dot{u}_3 \\ \dot{u}_7 \\ \dot{u}_8 \\ \dot{u}_9 \end{bmatrix} = \begin{bmatrix} -\frac{1}{I_5} & 0 & 0 & \frac{1}{I_5} & 0 & 0 \\ 0 & -\frac{1}{I_5} & 0 & 0 & \frac{1}{I_5} & 0 \\ 0 & 0 & -\frac{1}{I_5} & 0 & 0 & \frac{1}{I_5} \\ \frac{1}{I_5} & 0 & 0 & \frac{I_4+2ml^2}{I_2 I_5} & 0 & 0 \\ 0 & \frac{1}{I_5} & 0 & 0 & \frac{I_4+2ml^2}{I_2 I_5} & 0 \\ 0 & 0 & \frac{1}{I_5} & 0 & 0 & \frac{I_4+2ml^2}{I_2 I_5} \end{bmatrix} \begin{bmatrix} K_1 \\ K_2 \\ K_3 \\ -\tau_{d_1} \\ -\tau_{d_2} \\ -\tau_{d_3} \end{bmatrix} \quad (71)$$

where $I_5 = (I_4 + 2ml^2) - I_2$.

Arbitrary Torque Generation From a Sphere

Figure 3:
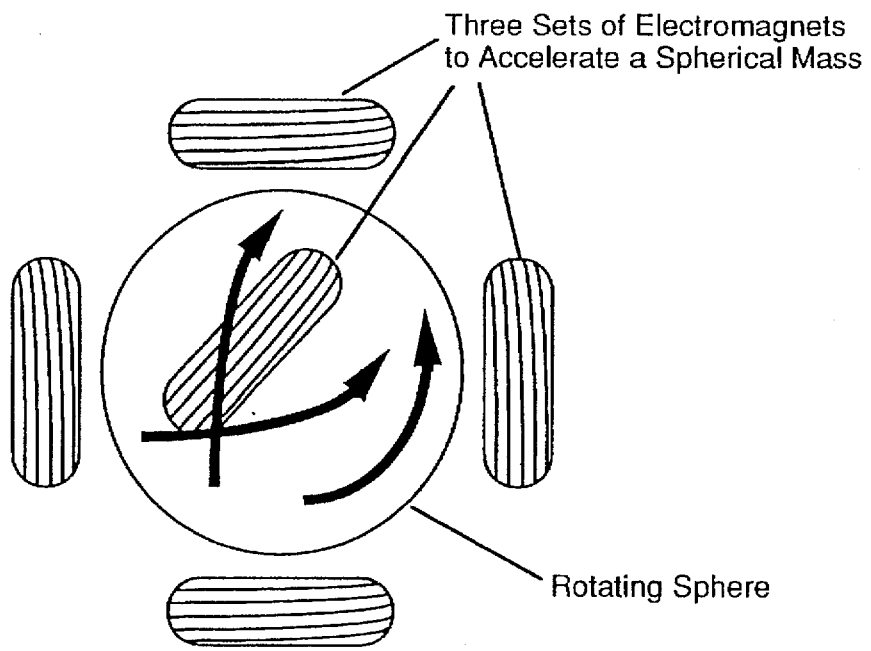
FIG. 3 is a drawing used to illustrate torque generation with respect to a momentum sphere.

The equations of motion for the sphere, see FIG. 3, can be derived from those for the three wheel device by noting these two salient differences between the systems: the inertia of the sphere is equal in all directions and is unchanged with orientations; and the center of mass of the sphere is located at the origin of reference frame B. The equations of motion for the sphere are given by:

$$\tau_x Z_1 + \tau_y Z_2 + \tau_z Z_3 - [(I_1+I_6)\dot{u}_1 + I_1\dot{u}_7 + I_1(u_2u_9 - u_3u_8)] = 0$$

$$\tau_x Z_4 + \tau_y Z_5 + \tau_z Z_6 - [(I_1+I_6)\dot{u}_2 + I_1\dot{u}_8 + I_1(u_3u_7 - u_1u_9)] = 0$$

$$\tau_x Z_7 + \tau_y Z_8 + \tau_z Z_9 - [(I_1+I_6)\dot{u}_3 + I_1\dot{u}_9 + I_1(u_1u_8 - u_2u_7)] = 0 \quad (72)$$

$$f_x - (m+M)\dot{u}_4 = 0$$

$$f_y - (m+M)\dot{u}_5 = 0$$

$$f_z - (m+M)3\dot{u}_6 - mg = 0$$

$$\tau_{d_1} - I_2 Z_{11} = 0$$

$$\tau_{d_2} - I_2 Z_{14} = 0$$

$$\tau_{d_3} - I_2 Z_{18} = 0$$

Because the cross-coupling through the linear velocity terms does not exist for this device, controlling a system that employs this device for stabilization is easier than controlling a system that employs three reactions wheels for stabilization.

Control Issues

Figure 4:
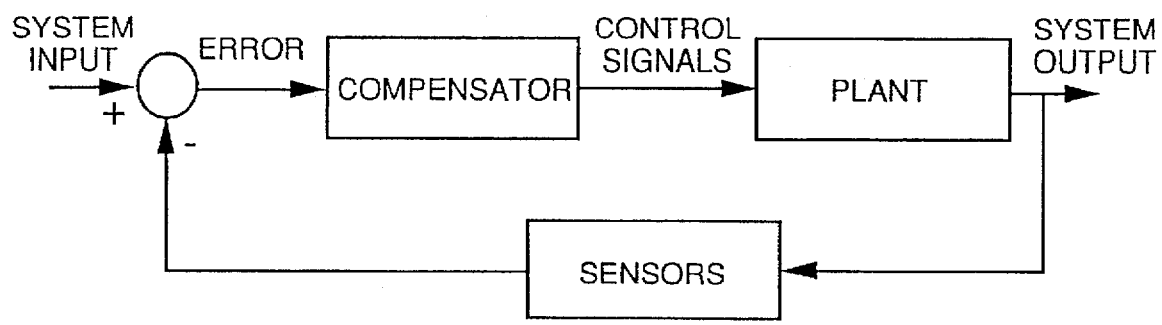
FIG. 4 is a block diagram illustrating a closed-loop control system.

Control theory is defined as a division of engineering mathematics that attempts, through modeling, to analyze and to command a system in a desired manner. Of particular interest are closed-loop systems. In a closed-loop system, the forcing signals of the system (calling inputs) are determined (at least partially) by the responses (or outputs) of the system. In this manner, the inputs and outputs are interrelated. In FIG. 4, a generic closed-loop control system is shown. In order to explain the contents of this diagram, the following example is used:

The objective is to control the temperature of a room. In this case, the sensor is the thermostat. The system input is set by selecting a temperature. Through either some mechanical or electrical means, the difference between the desired and actual temperature is calculated, resulting in an error. If the actual temperature is below the desired, the compensator sends out a control signal to the furnace (or plant). If the control signal says heat on (actually, the electromechanical equivalent), the furnace outputs heat. This process continues until the compensator determines it is not necessary to heat the room, and the control signal is changed to a heat off signal.

Control theory can be classified in two categories: classical and modern. Classical control theory is generally a trial-and-error system in which various type of analyses are used iteratively to force a electromechanical system to behave in an acceptable manner. In classical control design, the performance of a system is measured by such elements as settling time, overshoot and bandwidth. However, for highly complex, multi-input/multi-output (MIMO) systems entirely different methods of control system design should be implemented to meet the demands of modern technology. Modern control has seen wide-spread usage within the last fifteen years or so. Advancements in technology, such as faster computers, cheaper and more reliable sensors and the integration of control considerations in product design, have made it possible to extend the practical applications of automatic control to systems that were impossible to deal with in the past using classical approaches. Modern control theories are capable of dealing with issues such as performance and robustness. The spatially-unrestricted force-feedback system makes use of two modern control design methods: disturbance rejection and optimal control.

Figure 5:
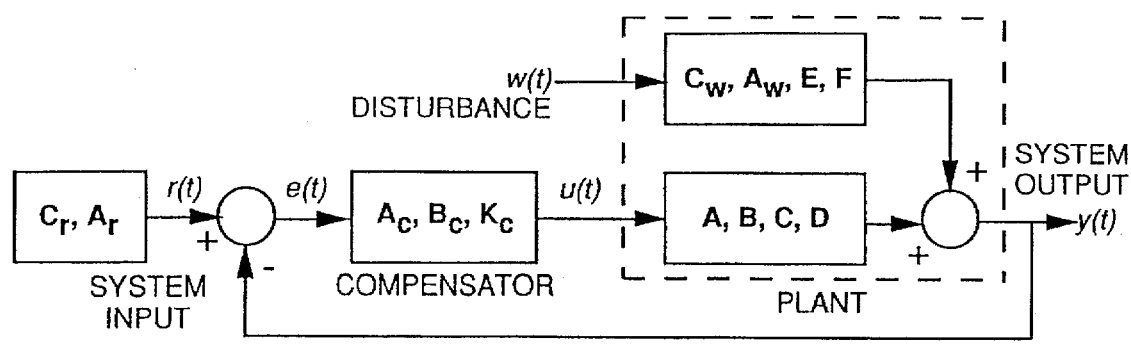
FIG. 5 is a block diagram illustrating a closed-loop control system with disturbance.

In the design of electromechanical systems, one can consider that the system will be exposed to disturbances. A disturbance may be defined as any unwanted input. In FIG. 5, the disturbance, w(t), is shown as a second input to the plant. The effect of the disturbance is added to the output of the plant.

Disturbance rejection design can be used to create a compensator which is able to ignore the disturbance and cause the desired plant output. In this section, the basic method of disturbance rejection design is presented using a MIMO model. For this model, notation must be established to designate the various elements of the control design; let:

[A, B, C, D] be a state-space representation of the plant (with state x), assuming (A,B) is completely controllable, $x(t) \in \Re^n$ be the plant state, $u(t) \in \Re^{n_i}$ be the plant input (where $n_i$ is the number of inputs and $n_o$ is the number of outputs), $w(t) \in \Re^d$ be the disturbance input $r(t) \in \Re^{n_o}$ be the desired or reference input $y(t) \in \Re^{n_o}$ be the sensor output $e(t) \in \Re^{n_o}$ be the tracking error The lumped MIMO linear, time-invariant (LTI) system, may be expressed as:

$$\dot{x} = Ax + Bu + Ew \quad (73)$$

$$y = Cx + Du + Fw \quad (74)$$

$$e = r - y \quad (75)$$

The model for the input (Equations (76)–(77)) and the noise (Equations (78)–(79)) are:

$$\dot{x}_r = A_r x_r \quad (76)$$

$$r = C_r x_r \quad (77)$$

$$\dot{x}_w = A_w x_w \quad (78)$$

$$w = C_w x_w \quad (79)$$

The objectives in the design of the feedback system in FIG. 5 are as follows:

Closed-loop system must be exponentially stable,

Achieve asymptotic tracking and disturbance rejection for all initial states

Robustness

If this is true, then for all initial states of the system, $e(t) \to 0 \in \Re^{n_o}$ as $t \to \infty$.

Given the system [A,B,C,D], suppose it is minimal. Let the compensator be given by $$\dot{x}_c = A_c x + B_c e \quad (80)$$

where $$A_c = \text{diag}[\Gamma_1, \Gamma_2, \ldots, \Gamma_{n_c}] \in \Re^{n_c \times n_c} \quad (81)$$

$$B_c = \text{diag}[\gamma_1, \gamma_2, \ldots, \gamma_n] \in \Re^{n_c \times n} \quad (82)$$

with $$\Gamma_i = \begin{bmatrix} 0 & 1 & & \\ 0 & \cdots & 1 & \\ & & & 1 \\ -\alpha_q & -\alpha_{q-1} & \cdots & -\alpha_1 \end{bmatrix} \in \Re^{q \times q} \quad (83)$$

$$\gamma_i = \begin{bmatrix} 0 \\ 0 \\ 1 \end{bmatrix} \in \Re^q \quad (84)$$

Since $A_w$ and $A_r$ are known, [83] can be derived from the equation $$\Phi(A_w;A_r) = s^q + \alpha_1 s^{q-1} + \ldots + \alpha_{q-1} s + \alpha_1 \quad (85)$$

which is the least-common multiple of the characteristic equations of $A_w$ and $A_r$.

Under these conditions, if $$\text{rank} \begin{bmatrix} \lambda I - A & B \\ -C & D \end{bmatrix} = n + n_0, \; \forall \lambda \in [\sigma(A_w) \cup \sigma(A_r)] \quad (86)$$

(which guarantees that the system is still completely controllable with the addition of the compensator) then The composite system is completely controllable
Asymptotic tracking and disturbance rejection holds
Asymptotic tracking and disturbance rejection are robust The discussion contained here is establishes a mathematical basis for the invention. Control of a gyro-stabilized force feedback device is based on its ability to respond robustly to a control signal and to respond correctly despite system noise. For the single-input/single-output (SISO) case, this theorem reduces to the classical control case where an integrator is required for robust performance. This result is used in the design of the 1D experiment which is similar to the classical satellite control problem.

Optimal control theory can be used to design compensators which are able to take into account the cost of performing a particular action. A classical example of optimal control is the use of fuel to maneuver a satellite in orbit above the earth. Two extreme scenarios are possible: movement taking minimum time or movement taking minimum fuel. In the following section, discussion will focus on the fundamental principles of optimal-control design.

The optimal control problem is to find a control $u^*(t)$ which causes the system $\dot{x}(t) = a[x(t), u(t), t]$ to follow a desired trajectory $x^*$ that minimizes the performance measure $$J(u) = h[x(t_f), t_f] + \int_{t_0}^{t_f} g[x(t), u(t), t] dt \quad (87)$$

Other names for J include cost function, penalty function, and performance index. Assume that the admissible state and control regions are not bounded. (This removes all mechanical constraints; these can be included in later development) Let the initial states, $x(t_0) = x_0$, of the system and initial time, $t_0$, be known. Also, let $x \in \Re^n$ and $u \in \Re^m$. The goal now is to establish tote necessary conditions for optimality:

Assuming that h is differentiable and that initial conditions are fixed and do not affect minimization, [b 87] can be expressed as $$J(u) = \int_{t_0}^{t_f} \left\{ g[x(t), u(t), t] + \frac{d}{dt} [h(x(t), t)] \right\} dt \quad (88)$$

For generality, apply the chain rule and include differential equation constraints to form an augmented cost function:

$$J_a(u) = \int_{t_0}^{t_f} \left\{ g[x(t), u(t), t] + \left[ \frac{\partial h}{\partial x}(x(t), t) \right]^T \dot{x}(t) + \frac{\partial h}{\partial t}(x(t), t) + p^T(t)[a(x(t), u(t)), t) - \dot{x}(t)] \right\} dt \quad (89)$$

using Lagrange multipliers $p_1(t), \ldots, p_n(t)$. To simplify the notation, rewrite [] as follows:

$$J_a(u) = \int_{t_0}^{t_f} \{g_a(x(t), u(t), p(t), t)\} dt \quad (90)$$

The necessary conditions for optimal control can be derived using calculus of variations. Specifically, take the variations of the functional $J_a(u)$ by $\delta x$, $\delta \dot{x}$, $\delta u$, $\delta p$ and $\delta t_f$. (Increment of the functional J is defined as: $\Delta J(x, \delta x) = \delta J(x, \delta x) + g(x, \delta x) \cdot \|\delta x\|$; $\delta J$ is linear with respect to $\delta x$; $\delta x$ is called the variation of the function x.) From this, the necessary conditions may be derived:

$$\dot{x}^*(t) = \frac{\partial}{\partial p} \mathscr{H}(x^*(t), u^*(t), p^*(t), t) \quad (91)$$

$$\dot{p}^*(t) = -\frac{\partial}{\partial p} (\mathscr{H}(x^*(t), u^*(t), p^*(t), t)) \quad (92)$$

$$0 = \frac{\partial}{\partial u} \mathscr{H}(x^*(t), u^*(t), p^*(t), t) \quad (93)$$

for all $t \in [t_0, t_f]$, and $$0 = \left[ \frac{\partial}{\partial x} h(x^*(t_f), t_f) - p^*(t_f) \right]^T \delta x + \left[ \aleph(x^*(t_f), u^*(t_f), p^*(t_f), t_f) + \frac{\partial}{\partial t} h(x^*(t_f), t_f) \right] \delta t_f \quad (94)$$

where $$\aleph(x(t), u(t), p(t), t) = g(x(t), u(t), p(t), t) + p^T[a(x(t), u(t), p(t), t)] \quad (95)$$

The principles of calculus of variations are applied to the design of a linear regulator. The linear regulator is used in the control of the motors used to spin the inertial masses to change the attitude of the satellite system. The regulator design is particularly useful in controlling unstable systems through optimal pole placement. First, recall the state equation of a linear, time-varying plant:

$$\dot{x}(t) = A(t)x(t) + B(t)u(t) \quad (96)$$

The cost function to be used is $$J = \frac{1}{2} x^T(t_f) H x(t_f) + \frac{1}{2} \int_{t_0}^{t_f} [x^T(t) Q(t) x(t) + u^T(t) R(t) u(t)] dt \quad (97)$$

where $t_f$ is fixed, H and Q are real, positive-semi-definite matrices, and R is a real, positive-definite matrix. The purpose of the regulator is to maintain the state of the system as close to a desired set of parameters as possible without excessive control effort. The necessary conditions for optimality to be used are:

$$\dot{x}^*(t)=A(t)x^*(t)+B(t)u^*(t) \quad (98)$$

$$\dot{p}^*(t)=-Q(t)x^*(t)-A^T(t)p^*(t) \quad (99)$$

$$0=R(t)u^*(t)+B^T(t)p^*(t) \quad (100)$$

where the Hamiltonian is defined as $$\mathcal{H}(x(t),u(t),p(t),t) = \frac{1}{2} x^T(t)Q(t)x(t) + \frac{1}{2} u^T(t)R(t)u(t) + \ldots \quad (101)$$

$$p^T(t)A(t)x(t) + p^T(t)B(t)u(t)$$

Equation (100) is easily solved for the optimal input for the regulator, yielding $$u^*(t)=-R^{-1}(t)B^T(t)p^*(t) \quad (102)$$

It is now possible to form an augmented, closed-loop state-space equation of the regulated system:

$$\begin{bmatrix} \dot{x}^*(t) \\ \dot{p}^*(t) \end{bmatrix} = \begin{bmatrix} A(t) & -B(t)R^{-1}(t)B^T(t) \\ -Q(t) & -A^T(t) \end{bmatrix} \begin{bmatrix} x^*(t) \\ p^*(t) \end{bmatrix} \quad (103)$$

These 2n differential equations have a solution of the form:

$$\begin{bmatrix} x^*(t_f) \\ p^*(t_f) \end{bmatrix} = \phi(t_f, t) \begin{bmatrix} x^*(t) \\ p^*(t) \end{bmatrix} \quad (104)$$

Note: $\phi(t_f,t)$ is called the transition matrix, define by $d/dt\phi(t_f,t)=A(t)\phi(t_f,t)$ with the initial condition of $\phi(t_0,t_0)=I$ and is solved through numerical integration. By partitioning the state transition matrix, $\phi(t_f,t)$, the following solution for $p^*(t)$ can be reached:

$$p^*(t)=K(t)x^*(t). \quad (105)$$

Therefore, the optimal control law is $$u^*(t)=-R^{-1}(t)B^T(t)K(t)x^*(t)=F(t)(x^*(t)); \quad (106)$$

the next step is to define a method of solving for K. This is achieved using a Riccati-type differential equation:

$$\dot{K}(t)=-K(t)A(t)-A^T(t)K(t)-Q(t)+K(t)B(t)R^{-1}(t)B^T(t)K(t) \quad (107)$$

which involves solving n(n+1)/2 first-order differential equations. Fortunately, the motor system involved in the hand controller control system can be considered time invariant. This simplifies the previous equations, which can be summarized as:

$$\dot{x}(t)=Ax(t)+Bu(t) \quad (108)$$

$$J = \int_0^\infty [x^T(t)Qx(t)+u^T(t)Ru(t)]dt \quad (109)$$

$$\dot{K}=-KA-A^TK-Q+KBR^{-1}B^TK=0 \quad (110)$$

and the optimal control law is $$u^*(t)=-R^{-1}B^TKx^*(t)=Fx^*(t). \quad (111)$$

Figure 6:
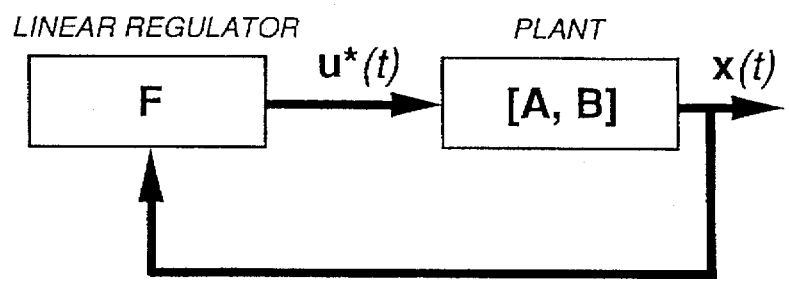
FIG. 6 is a block diagram depicting plant feedback with optimal feedback for linear regulations.

As long as Q is positive definite, the closed-loop system is guaranteed to be stable and the controller may be used for pole placement design of the system, as shown in FIG. 6.

The design of the controller system for the 1D model is now presented. The first segment of the design is a optimal pole-placement. This is needed because the 1D model of the spatially unrestricted force feedback device (which is a simplified version of the actual 3D version), which can be considered a second-order system, is inherently unstable. Definitions of "stable" vary; here, "stable" is considered any plant which has only poles and zeros to the left of the imagery axis in the complex plane (i.e., left-hand poles and zeros). Using previously established results, the poles of the system are placed optimally based on the inertia of a second-order linear model. Lastly, disturbance rejection is augmented to the control system for robustness.

Figure 7:
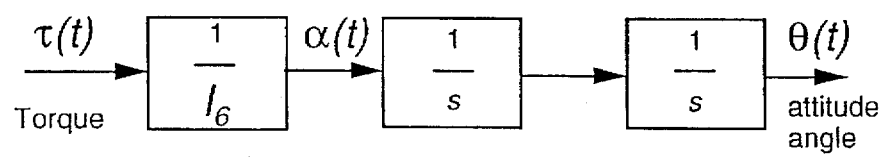
FIG. 7 is a representation of a mathematical model of a 1-D model plant.

The plant for a single DOF hand controller, FIG. 7, has the form $$\frac{\tau(t)}{I_6} = \alpha(t) \quad (112)$$

where $\alpha(t)$ is the angular acceleration, $I_6$ is the inertial mass, and $\tau(t)$ is the torque.

Since the stability of this system is (at best) marginal, a pole placement is performed. Further, optimal methods are employed for placing these poles at the best locations. The new plant will follow the model in FIG. 8. The optimal design will give the "best" values to use for $K_1$ and $K_2$.

The first step is to choose the cost function to minimize, set initial conditions, and select the necessary conditions and boundary conditions which apply to this problem. Let the initial states of the satellite be zero: $x(0)=0; \dot{x}(0)=0$. The cost function for minimal control effort is $$J = \frac{1}{2} \int_0^{t_f} [u(t)]^2 dt \quad (113)$$

such that the amount of acceleration of the system, whether it is positive or negative, for all time is minimal. This is frequently used for satellites because the amount of acceleration is the magnitude of the control input, or for satellite, the amount of fuel, which is a limited resource. For this system, the following parameters are known:

$$A = \begin{bmatrix} 0 & 1 \\ 0 & 0 \end{bmatrix} \quad (114)$$

$$B = \begin{bmatrix} 0 \\ \frac{1}{I_6} \end{bmatrix} \quad (115)$$

with a state defined by $$\begin{bmatrix} x \\ \dot{x} \end{bmatrix} = \begin{bmatrix} x_1 \\ x_2 \end{bmatrix} \quad (116)$$

and choose $$Q = \begin{bmatrix} q_1 & 0 \\ 0 & q_2 \end{bmatrix}$$

and R=1.

For the LTI Ricatti equation, [110], K has four solutions, but the only positive-definite solution is $$K = \begin{bmatrix} \sqrt{q_1} & \sqrt{2I_6\sqrt{q_1}+q_2} & I_6\sqrt{q_1} \\ I_6\sqrt{q_1} & & I_6\sqrt{2I_6\sqrt{q_1}+q_2} \end{bmatrix} \quad (117)$$

which results in a regulator, F, of the following form:

$$F = \begin{bmatrix} \sqrt{q_1} \\ \sqrt{2I_6\sqrt{q_1}+q_2} \end{bmatrix} = \begin{bmatrix} K_1 \\ K_2 \end{bmatrix} \quad (118)$$

Figure 8:
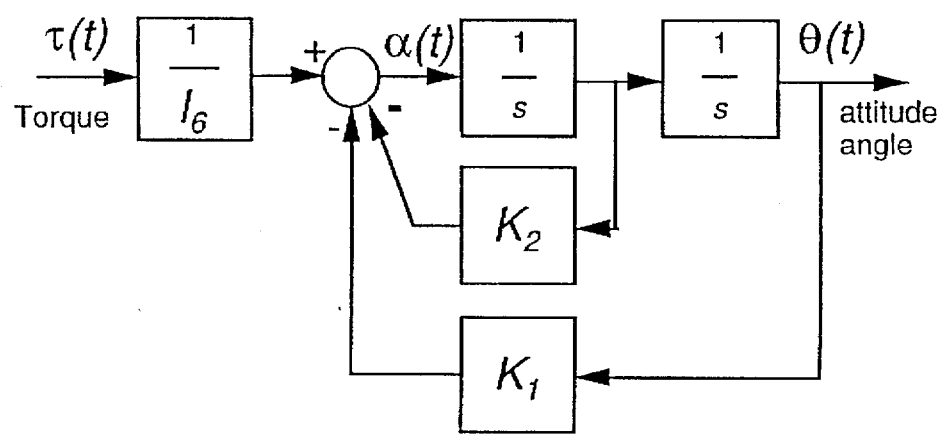
FIG. 8 is a state diagram used to illustrate position regulation of a 1-D satellite plant using pole placement.

The two terms of the F vector are the position feedback and velocity feedback required for optimal tracking, as in FIG. 8.

Figure 9:
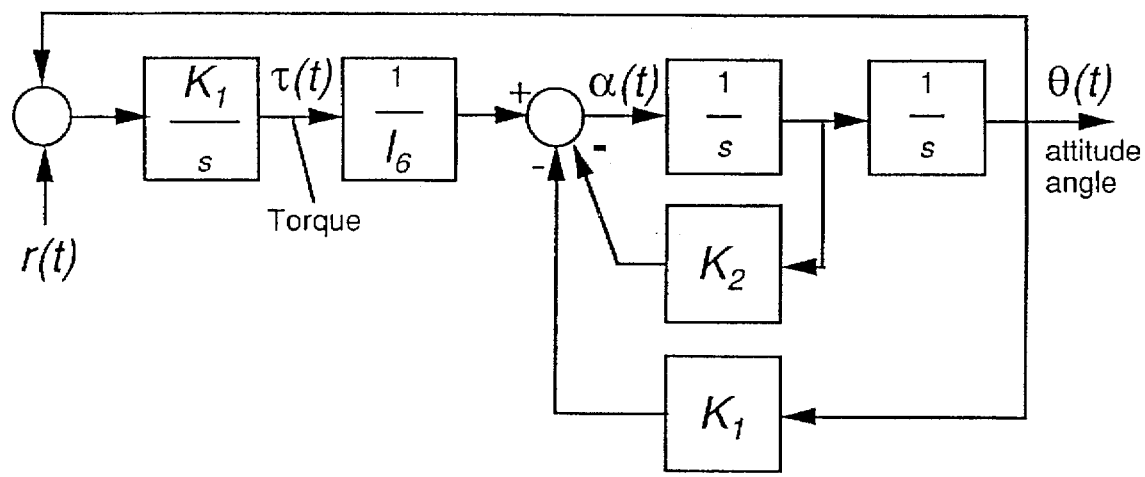
FIG. 9 is a state diagram used to illustrate a final design of a 1-D satellite model controller.

The final step is to include an integrator which provides the SISO case with robustness. The final controller design is shown in FIG. 9.

Figure 10:
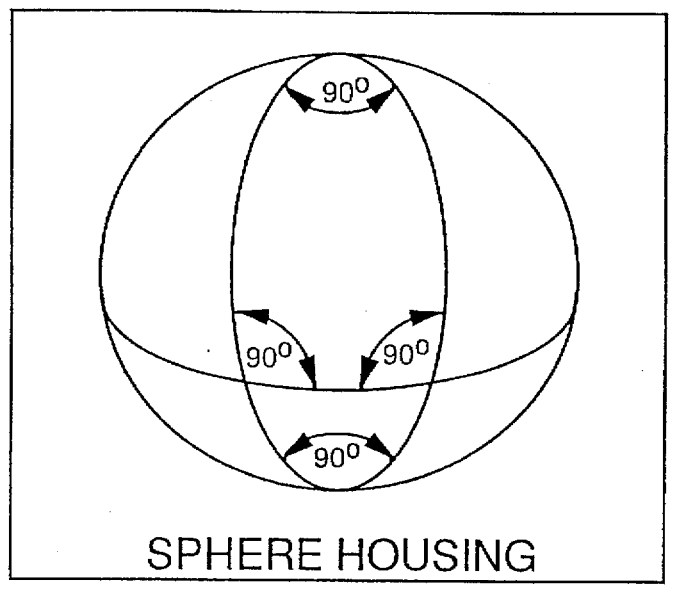
FIG. 10 is a skeletal representation of momentum sphere housing.

There are some control issues that are specific to the momentum wheel concept. These issues are those that deal with determining the state of the sphere, which must be known to calculate the sphere's angular momentum vector. Since the nature of a spherical object allows it to be at any orientation relative to it's cavity, a method that can detect the sphere's exact orientation relative to the three fixed orthogonal axis of the sphere housing is used. This is illustrated in FIG. 10.

Figure 11:
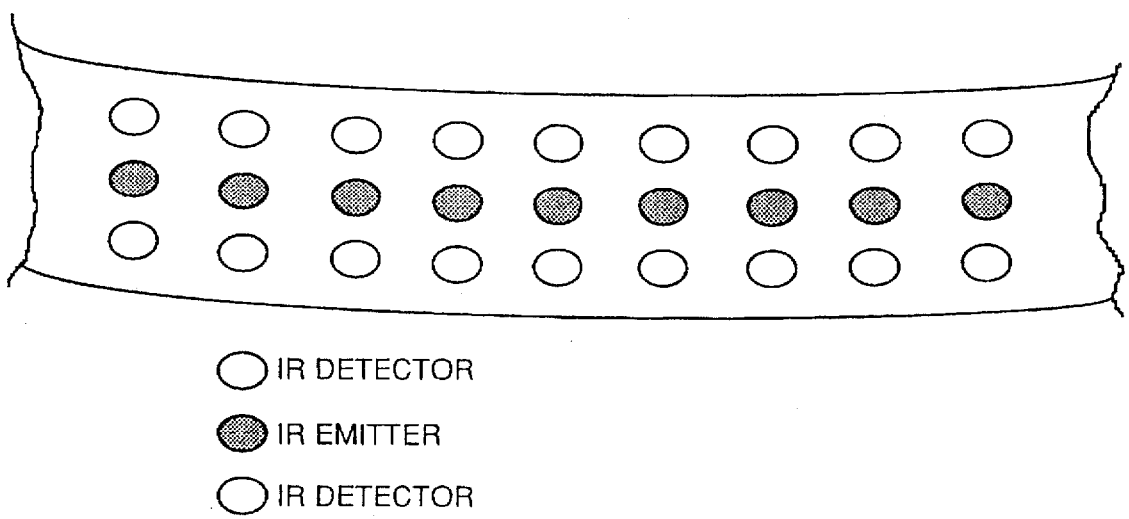
FIG. 11 is a simplified drawing of an aspect of a momentum sphere depicted infrared emitters and detectors.

Each of the three sphere housing axis is outfitted with a band of optical infra-red emitters to detect the relative position of the sphere. Each emitter will be placed between two (or more) infra-red detectors as shown in FIG. 11. This technique will enable fine position sensing and simultaneously minimize power requirements since a single emitter will service two (or more) detectors.

Figure 12:
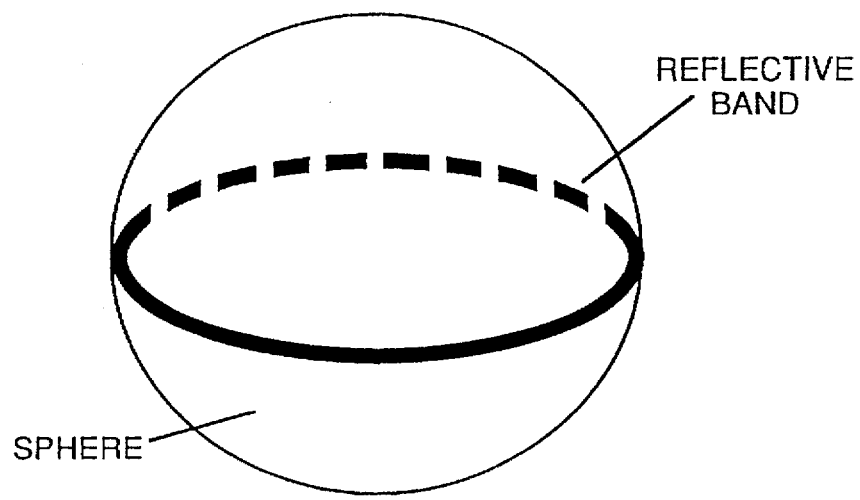
FIG. 12 is a simplified drawing showing a great circle band of reflective material around a momentum sphere.
Figure 13:
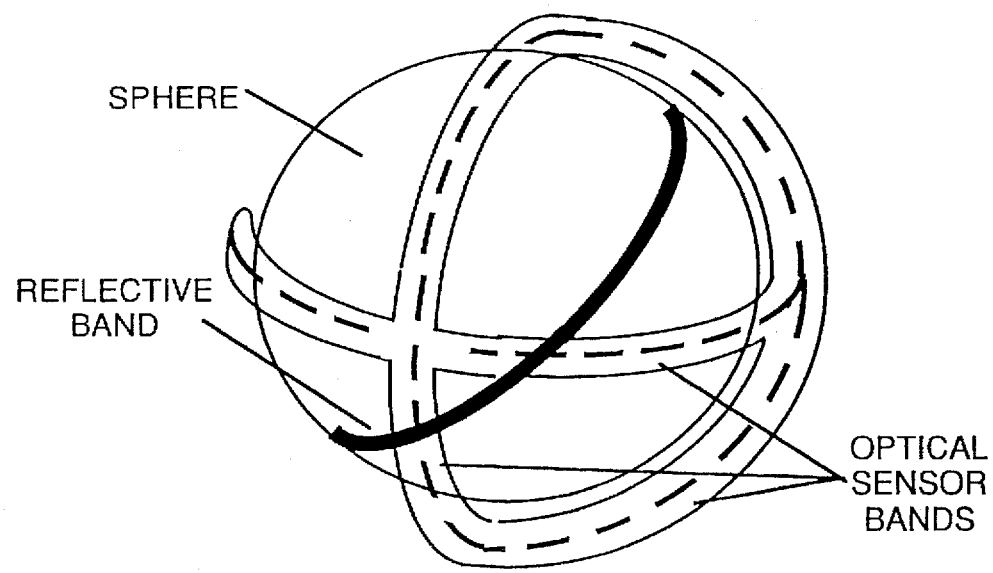
FIG. 13 is a drawing, seen from an oblique perspective, illustrating a different aspect of a momentum sphere.

The sphere is equipped with a single great circle band of reflective material as illustrated in FIG. 12. As shown in FIG. 13, each sensor band on the sphere housing covers one half of the great circle band on each sphere housing axis. Consequently the reflective band is always within range of at least three optical emitter/detector pairs regardless of sphere orientation.

Figure 14:
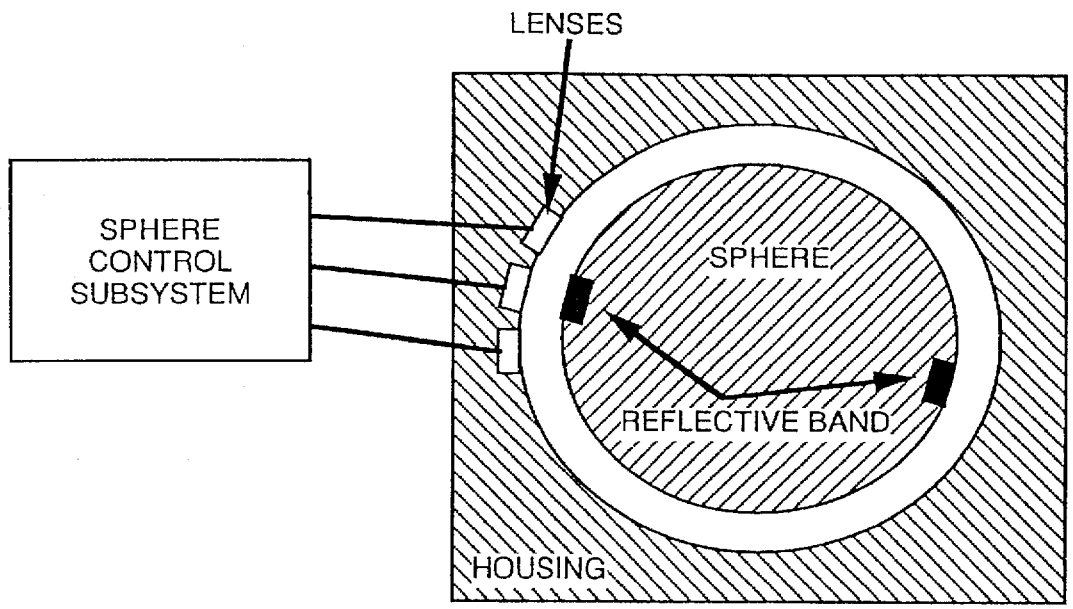
FIG. 14 is a cross-sectional view of a momentum sphere illustrating how a control subsystem may interact with optical emitters and a reflective band.

The IR emitter/detector sensors are located directly on the cavity face to simplify construction of the sphere housing. Each emitter and detector is directly interfaced to the housing cavity by a fiber optic cable that ends at a lens mounted on the cavity face as shown in FIG. 14. Using a lens permits the use of lower power infra-red emitters.

Figure 15:
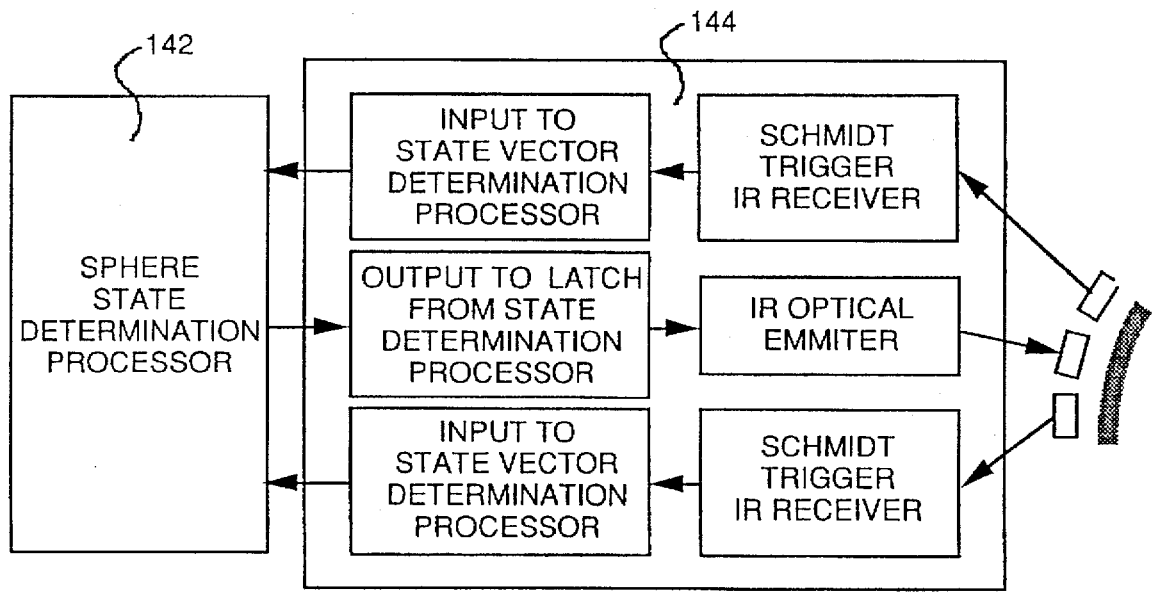
FIG. 15 is a block diagram used to describe a momentum sphere control environment.

As shown in FIG. 15, the infra-red emitters are driven by an output bit from the Sphere Control Computer. Address decode logic and latch bits contained in the Sphere Control Subsystem decode emitter data from the control computer and turn the appropriate IR emitter on. The control computer reads the associated IR receiver, via the same decode multiplexor logic in the Sphere Control Subsystem.

Conventional Applications to Spacecraft

Figure 16:
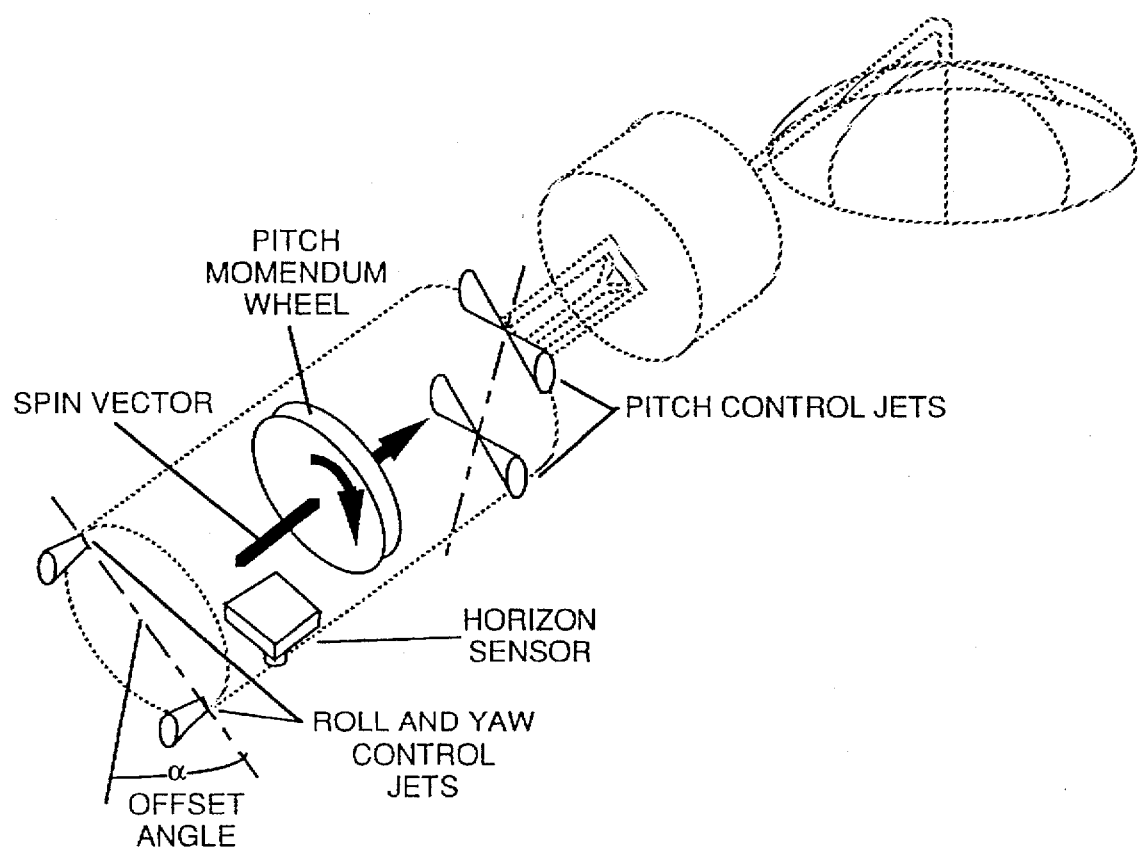
FIG. 16 is a drawing, as seen from an oblique perspective, of a spacecraft including a pitch momentum wheel.

There are two inter-related branches of mechanics that are used to spacecraft control: celestial mechanics and attitude mechanics. The former deals with the position and velocity of the center of mass of the spacecraft as it travels through space, whereas the latter deals with the motion of the spacecraft about its center of mass, see FIG. 16.

Attitude mechanics is divided into three components: determination, prediction and control. Attitude determination is the process of computing the current orientation of the spacecraft with respect to some specified inertial frame. Attitude prediction is the process of computing the future attitude of the spacecraft based on its current state and motion. Attitude control is the process of applying torques to the spacecraft to reorient it into some desired future state. The devices mentioned in this patent deal primarily with the control aspect of attitude mechanics.

For most modern spacecraft applications, three-axis control is required. This method of control allows mission planners to specify the orientation of the spacecraft at all times during the course of a mission. Missions that employ this type of control include all communications satellites, the space shuttle and earth-orbiting scientific satellites.

To function properly, three axis stabilized spacecraft employ sensing devices that identify the spacecraft's attitude by determining two mutually perpendicular orientation vectors. Some typical examples include two-axis sun sensors and magnetic field sensors. Once the spacecraft's attitude is determined, the mission profile determines the control requirements. Certain scientific satellites require extremely precise attitude control (arc-seconds) for the purpose of data collection. Others, such as C-band television satellite, require less precise control (arc-minutes). Since all satellites are subject to disturbances, some method of maintaining proper orientation is required.

There are three primary means for controlling a satellites attitude: gas jets, electromagnets and reaction wheels. Reaction jets operate by expelling gas through an orifice to impart a moment on the spacecraft. These devices can produce large (but imprecise) torques, but since they expend fuel, there on-station operating time is limited. Electromagnets operate by creating magnet fields that interact with the magnetic field of a nearby body to produce a torque on the satellite. Although these systems do not expend fuel, they only function near bodies with large magnetic fields. Reaction wheels operate by way of Newton's third law by accelerating a wheel to absorb torque that is applied to the satellite. If the applied disturbances are cyclic, these systems can operate indefinitely since there is not net gain/loss of energy. For real-world systems, reaction wheels typically operate in conjunction with gas jets, which are used to bleed off excess momentum as the wheels approach their operating condition boundaries. Reaction wheels provide a very fine degree of attitude control.

Applications for Platform Stabilization

Figure 17:
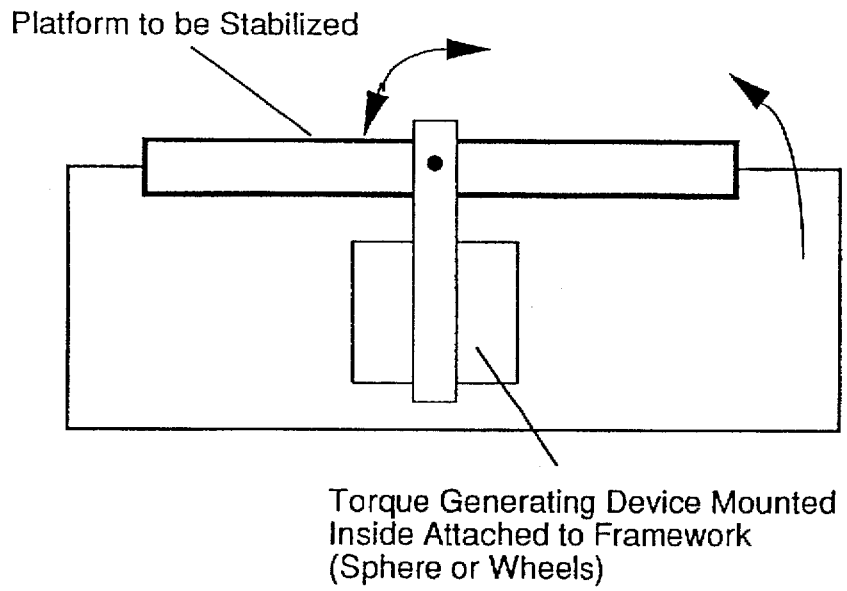
FIG. 17 is a simplified drawing used to illustrate the stabilization of a gimbal sensor platform.

What differentiates space-based applications from other applications is not the lack of gravity but rather the fact that gravity is the same in all directions. Similar situations can occur on the Earth: system with neutral buoyancy in a liquid and systems that are fixed in the direction of gravity operate under similar principals as space-based systems, see FIG. 17.

For example, consider the case where a sensor platform is to collect data from a lake over a period of time. If this platform is required to maintain a particular attitude, a gyroscopic system can be used for stabilization. Similarly, a sensor platform mounted on a research balloon may be required to maintain two-axis attitude control for the duration of the mission. Again, a gyroscopic system can be used to stabilize the two rotational degrees of freedom of this system.

EXAMPLES

Two sets of experiments were carried out with the single degree of freedom device. The first experiment was intended to validate Equation (119). A second experiment was intended to demonstrate a control system for a three DOF system.

Figure 18:
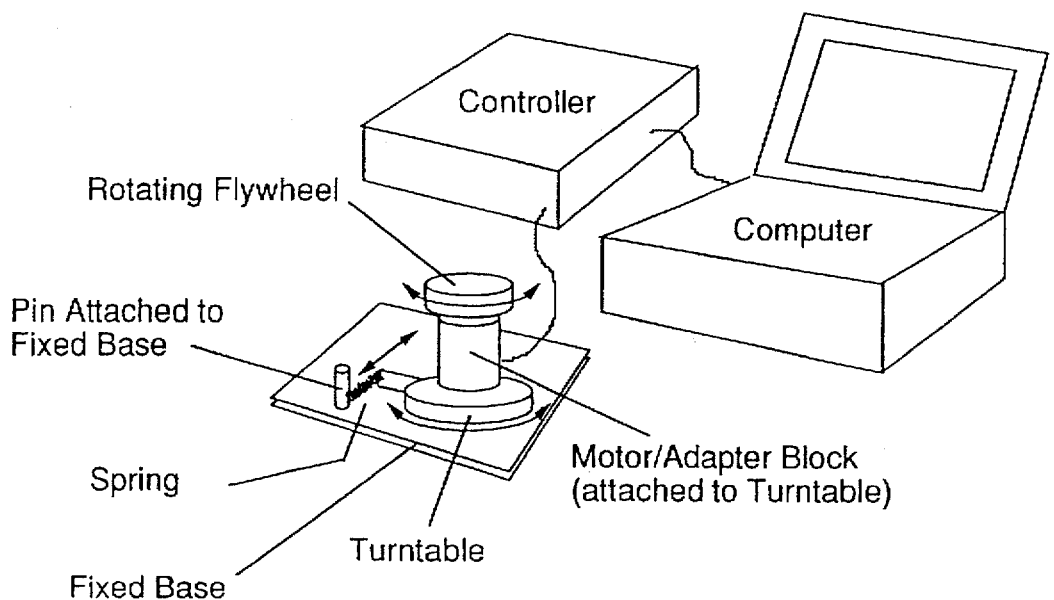
FIG. 18 is a block diagram of a single-axis momentum wheel for terrestrial applications.

To carry out these tests, a test stand was developed, as shown in FIG. 18.

This test setup consists of the following components:

- A turntable with an attached motor. The position of the turntable is instrumented with an incremental encoder attached directly to the turntable (not used in this experiment). The position of the motor shaft was not instrumented, however, its angular velocity is instrumented. The motor employed is a Hathaway model 1500, attached to the turntable by means of an adapter block.
- A momentum wheel attached to the motor shaft. This momentum wheel is manufactured from a piece of stock, 2 inch diameter, cast iron shaft.
- The motor is attached to a CyberImpact® Intelligent Motor Controller (IMC) system, a standard Cybernet product and is used with all of our force feedback devices, which provides an interface to a PC based controller that allows for a wide range of motion commands to be programmed.
- The IMC is attached to a PC. In this example, a simple, previously developed interface to start and stop the motor was employed. This interface presents the user with an input screen for directly controlling the motor current. By setting the current to its maximum allowable value, the maximum obtainable torque is observed. By setting the current to zero, the motor comes to a stop.
- A torque measuring system consisting of a spring and a camera. Applied torque was measured by the displacement of a known spring and the time for this to happen by counting video frames.

The position, velocity, and/or acceleration provided on a user-interactable member is sensed and transmitted as a command to a computer model or simulation which implements a virtual reality force field. In turn, the force field value for the given position, velocity, and/or acceleration is sent back to the member, which generates a force command, thereby providing the user with direct kinesthetic feedback from the virtual environment traversed. Although applicable to controlling a virtual or simulated environment, the technology is also well suited to the control of a remote or physical device. Further, the present invention is suited for application to any number of axes.

The operation of the IMC system and PC interface will be best understood by referring to commonly assigned U.S. Pat. Nos. 5,389,865 and 5,459,382, and pending applications Ser. Nos. 08/513,488 and 08/543,606, the contents of each of which are incorporated herein in their entirety by reference. These patents and co-pending applications describe systems and methods for presenting forces to an operator of a remote device or to a user interacting with a virtual environment in multiple axes simultaneously mediated through a computer controlled interface system which provides a position, velocity, and/or acceleration (to be referred to generally as "force") to a user interface which, in turn, generates an electrical signal for each of a plurality of degrees of freedom. These electrical signals are fed to a virtual reality force field generator which calculates force field values for a selected force field. These force field values are fed to the force signal generator which generates a force signal for each of the plurality of degrees of freedom of the user as a function of the generated force field. These motion commands are fed back to actuators of the user interface which provide force to the user interface and, thus, to the user in contact with the interface device.

Before discussing these applications in further detail, a background will be provided with respect to inertial stabilization as its relates to reaction wheels and space-based applications, as certain principles of spacecraft platform stabilization have, for the first time according to this invention, been applied to spatially unrestricted terrestrial control.

Experimental Data for 1D Device Implementation

Since a known momentum wheel was used, the form of Equation (29) is not quite right for this experiment. Instead, this equation is rewritten as $$t = \frac{mr^2 P}{2\tau^2} \tag{119}$$

where the factor of two is used because a solid disk, not a thin hoop, was used. The mass of the momentum wheel is 0.277 kg (measured) and the inertia of the motor rotor is ignored.

Using the motor electrical parameters and the electrical characteristics of the IMC chassis, the maximum torque that can be applied by the motor is known to be 0.18 Nm. Inserting these values into Equation (119) yields a time of 0.09 seconds.

To measure the torque, a spring with a spring constant 110 N/m was attached to the adaptor block by way of a bolt, at a distance of 0.050 m from the center of rotation. Since F=kx and τ=Fd, these terms can be related in the following manner $$x = \frac{\tau}{kd} . \tag{120}$$

Figure 19:
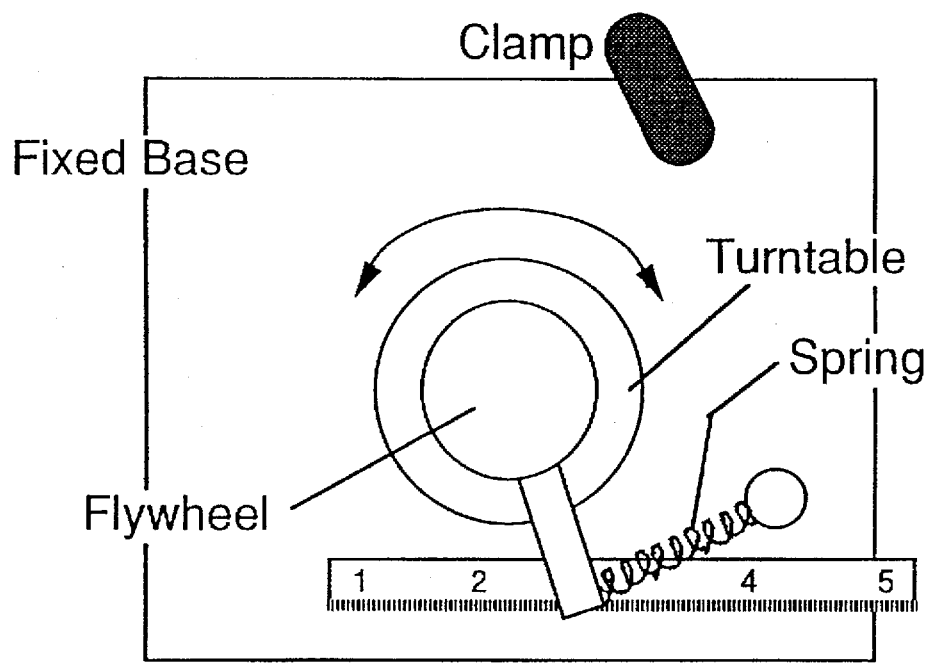
FIG. 19 is a drawing of a momentum wheel viewed from a top-down perspective, before the application of motor current.
Figure 20:
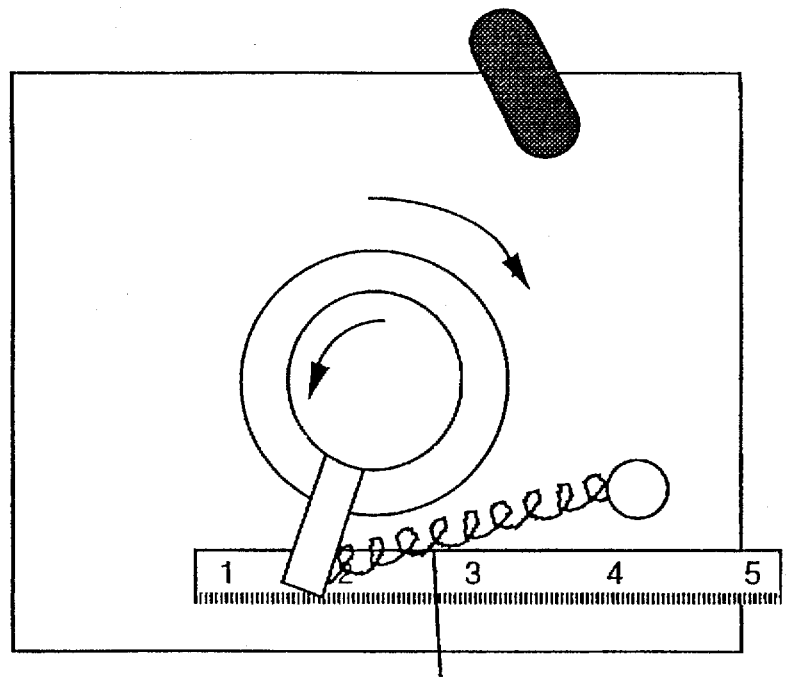
FIG. 20 is a drawing of a momentum wheel after the application of motor current.

Of course, the equations used are very primitive and do not account for many of the real-world affects. The affects, which are primarily frictive in nature, should tend to make the displacement less than predicted and the time greater than predicted. The results of these experiments are shown in FIG. 19 and FIG. 20. The picture on the left shows the system just before current is applied to the motor. The picture on the right shows the system at maximum spring extension, which occurred five video frames, at 30 frames per second, later. The results show a displacement of 1.2 inches (0.030 m) and a time of 0.16 seconds. Given the experimental setup, these results are well within the range of experimental error, thus giving credence to the model.

Experiments were also performed to control the position of the turntable, in the face of disturbances, by controlling the speed of the momentum wheel. The equations and methods used to develop this control scheme were discussed previously. For this experiment, the same setup was used as for the previous experiment with several small modifications:

- The instrumented readings from the turntable and the motor shaft were used by the controller.
- The spring was removed from the experimental setup.
- A control program was written that interfaces directly with the IMC system.

Figure 21:
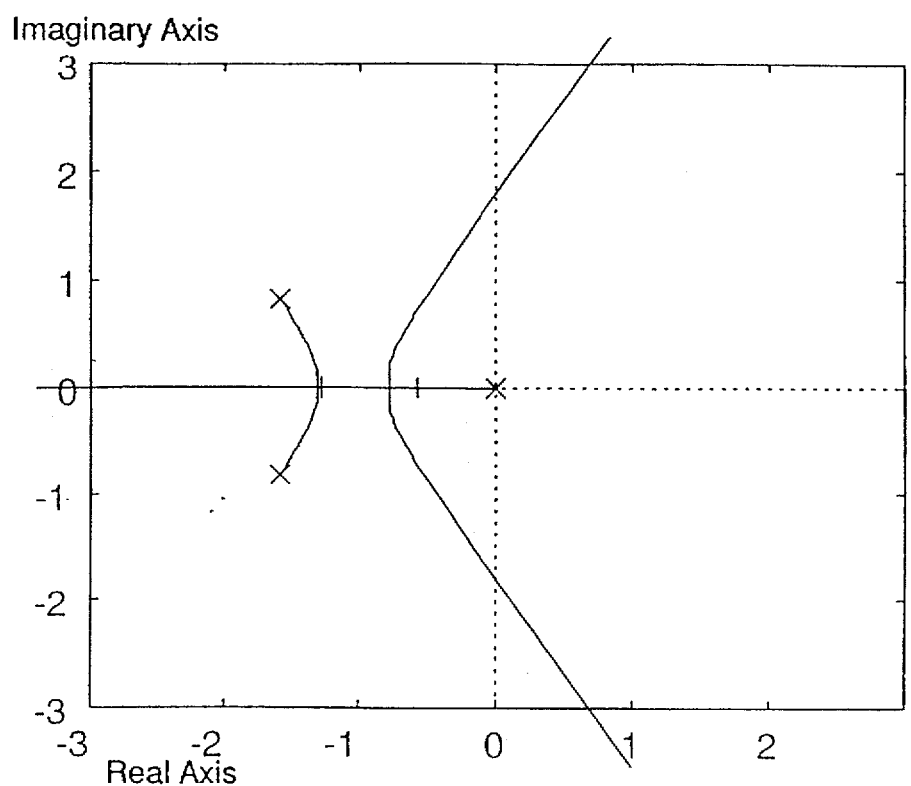
FIG. 21 is a root-locus plot.

Using MATLAB, which is a PC based mathematical tool designed to aid engineers in the development of complex mathematical systems, the controller and plant were simulated. Since the amount of control input is not a particular concern, optimal control parameters were selected to produce a system that responds quickly. In the following experiments, the values $q_1=q_2=10$ and $R=1$ were selected. To select an appropriate value for the disturbance rejection gain, a root locus plot of the system, FIG. 21, was developed.

Figure 22:
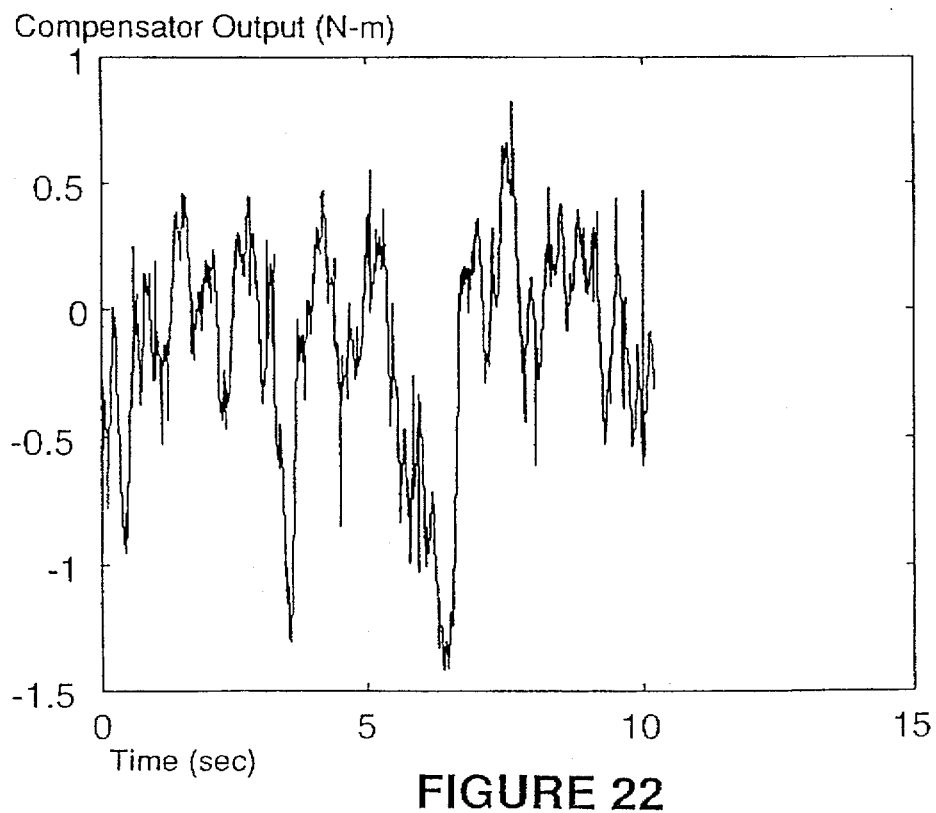
FIG. 22 is a time-response plot of a one-dimensional motor application according to the invention.

From this diagram, the gain of the system, which is selected to produce fast response time, has value of approximately $1.33 \times 10^{-5}$. The response of the system of a unit step disturbance is shown in FIG. 22 (plot generated from MatLab). These parameters were then used in testing a real model of the system.

The control parameters determined using the optimal control techniques and the root-locus method were applied to the system shown in FIG. 18 (without the spring). Since the control equations require the moment of inertia of the platform, CAD tools were used to calculate the moment of inertia of the motor, the adapter plate and the bolt. One item that was not modeled in the simulation, or the calculations for determining control parameters, was the friction in the system.

In this particular device, there was a great deal of Coulomb friction in the base bearing. The components mounted to the base would not complete a single rotation before coming to a halt after an initial spin. This has the effect of adding instability to the system. In particular, what tends to happen is that the system will stay at some point for some period of time while the integrator error (the disturbance rejection) adds up. At some point, there is sufficient energy to overcome the static friction, which is less than the dynamic friction. Once moving, the system will tend to overshoot the desired point and try to compensate, but the same sequence of events occurs.

Figure 23:
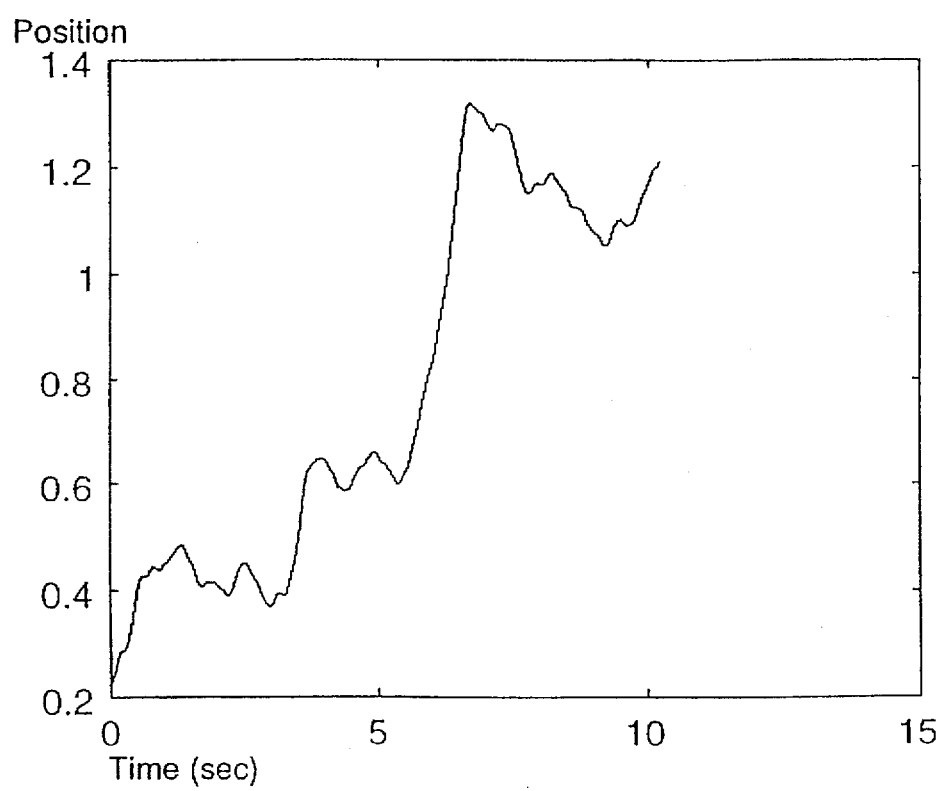
FIG. 23 is a graph used to illustrate the control effort of a 1-D motor.

FIG. 23 shows actual data from an experiment to control the physical device. Despite the friction problem, the results from this test are as expected. The system does oscillate about the control point, though it is quite noisy.

An experiment was also performed to determine if the forces generated were noticeable by a human. To perform this experiment, three motors with momentum wheels were mounted onto the adapter block used in the previous experiments.

Figure 24:
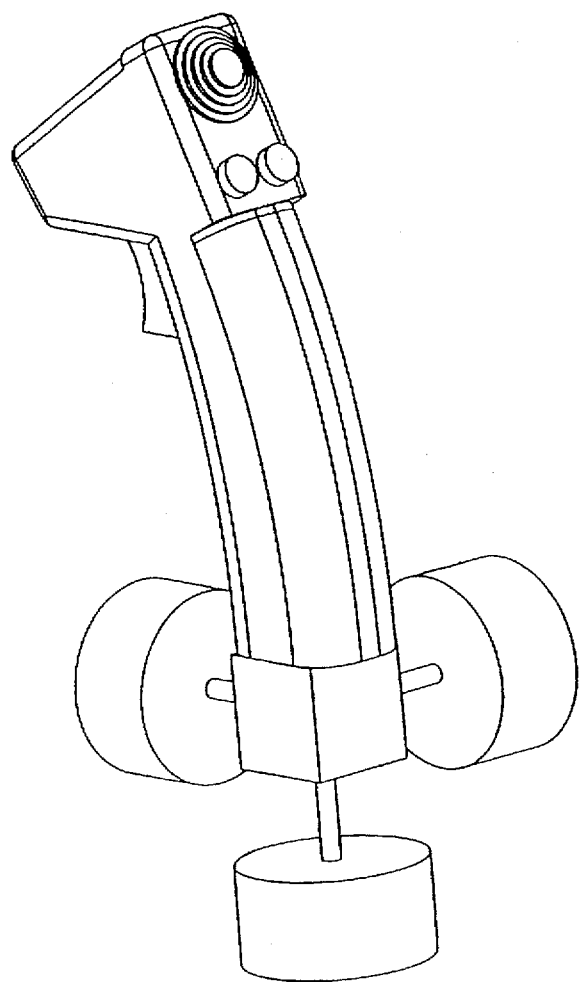
FIG. 24 is a drawing, as seen from an oblique perspective, of a hand-held force-feedback controller utilizing three momentum wheels to provide inertial stabilization in three space;.

The motors were spun up to a speed of 5000 RPM. Individuals were asked to handle the device and to make subjective evaluations of the torques felt as the device was moved about. In all cases, the subjects reported feeling appreciable forces that were deemed to be sufficient for carrying out meaningful tasks. A picture of the device is shown in FIG. 24.

The torques felt were generated because the control system had been commanded to maintain the momentum wheels at a constant angular velocity. By moving the device about, the angular momentum vectors were changed, thus causing a torque. The control system compensated for these motions by adjusting the output to the motors. Since the motors were already spinning at high speed, the period of time for which a torque could be applied was far more limited than for the case where the motor is initially at rest.

Figure 25:
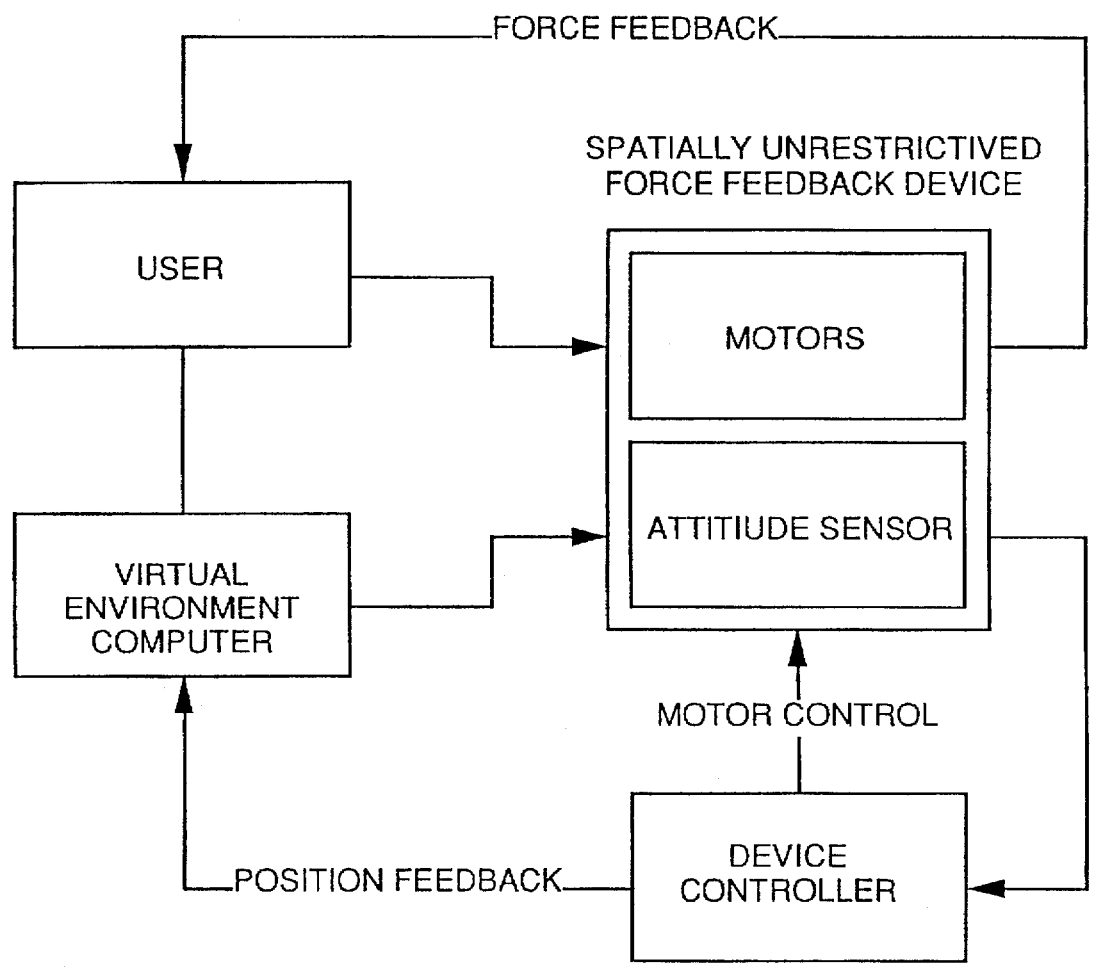
FIG. 25 is a drawing of a block diagram of a spatially unrestricted force feedback controller utilizing three momentum wheels to provide inertial stabilization in three space.

Having demonstrated that forces can be generated in any direction, the final task is to control the motors in an appropriate manner so as to provide haptic feedback to the user. This task requires a sophisticated control algorithm for two reasons: first, the platform will be grossly displaced from its nominal operating orientation, and second, for any motion of the platform (for simplicity consider just rotations about the world coordinate axes with which the device is initially oriented), some subset of the motors will produce torques (due to changes in the orientation of the angular momentum vectors) that are undesired. To counteract these undesired torques, some subset of the motors will need to be accelerated to produce counter torques. The control system must model the full, non-linear dynamics of the system, have a high speed attitude sensor and possibly a control to smoothly generate the prescribed forces. A block diagram of the system is shown in FIG. 25.

Applications

As discussed above, one family of applications for the devices described above utilizes inputs received from a virtual environment. For this type of application, the virtual environment models some set of objects, and hand controller or other force-reflection device produces forces that are representative of some activity within the virtual environment. Since it is not required that the forces produced correlate to any specific activity, the only restriction placed on the commands sent to the gyro-stabilized device is that the output forces be within the range of forces that the device can produce. An alternative family of applications for these devices produces forces in accordance with inputs received from a (possibly remote) physical device. For this type of application, the forces produced are typically a scaled representation of the actual forces produced at some point on the actual physical device. To provide the widest range of haptic input, the scaling is typically designed such that the maximum force that can be applied to the physical device is mapped into the maximum force that the haptic device can produce.

To the first order, the devices described are marginally stable at best. To control these devices to produce desired torque outputs in the face of input disturbances, a two step controller is preferably utilized. The first step stabilizes the controller by doing a pole placement. The location of the poles can be determined using any applicable method although optimal control is preferred. The second step creates a robust controller by canceling out disturbance inputs. Robust control theory is applied for this task.

With specific regard to platform stabilization, the desired input is typically a zero input, i.e., that the system should not change state. For these applications, sensor are employed to determine when the system changes state due to disturbances and the controller acts to return the system to the zero state.

Unloading

The human operator who controls the haptic device is, from the perspective of the momentum device, equivalent to group. Although any amount of angular momentum can be removed from the device when it is coupled to ground, since this is a haptic device, the strategy is to slowly and continually remove angular momentum so as to have as minimal affect on the user as possible. In particular, the momentum sphere has a maximum speed at which it can operate due to the materials and construction techniques employed. When the sphere approaches this maximum velocity, momentum must be unloaded from the sphere for it to continue to function. To do this requires the application of an external torque that will cause the angular momentum vector to be diminished. This can be accomplished in three ways: reaction jets, magnetic field torquers and/or spacecraft reorientation. The first two methods work by applying a torque to the spacecraft that diminished the angular momentum of the sphere. The third method works if the following two conditions are met: the disturbances to the spacecraft are primarily applied in the same direction and the spacecraft can continue to operate at different attitudes. If these conditions are met, the spacecraft can be reoriented such that the disturbance torque act to cancel the sphere's angular momentum. It may also be feasible to rigidly couple the platform to ground for a brief period of time. While coupled to ground, any amount of angular momentum can be removed from the stabilized platform.

What is claimed is:

1. A spatially unrestricted force-feedback device, comprising:

a body;

gyroscopic means connected to the body to provide an inertial reference to stabilize the body in at least one spatial dimension;

a user-interactable member connected to the body; and force-feedback means coupled to the member, enabling a user of the device to experience the feedback of forces relative to the gyroscopically stabilized body.

2. The device of claim 1, wherein the user-interactable member is a joystick.

3. The device of claim 1, wherein the user-interactable member includes a handle.

4. The device of claim 1, wherein the user-interactable member is a steering wheel.

5. The device of claim 1, wherein the user-interactable member is a device associated with the simulation of a sport.

6. The device of claim 1, further including:

a computer system modeling a virtual environment including one or more virtual objects; and wherein the user-interactable member is in electrical communication with the computer system to generate forces on the member as a function of an activity involving an object within the virtual environment.

7. The device of claim 1, wherein the gyroscopic means includes a momentum wheel, and wherein a torque is produced on the member through accelerating and decelerating the angular velocity of the wheel.

8. The device of claim 7, including three momentum wheels to stabilize the body in three dimensions.

9. The device of claim 1, wherein the gyroscopic means takes the form of a reaction sphere operative to produce arbitrary reaction torques about three linearly independent axes of the body.

10. The device of claim 1, further including an angular position measuring device to determine the state of the body in space.

11. The device of claim 10, wherein the angular position measuring device is a potentiometer.

12. The device of claim 10, wherein the angular position measuring device as an encoder.

13. The device of claim 1, further including an angular velocity measuring device to determine the state of the gyroscopic means.

14. The device of claim 13, wherein the angular velocity measuring device is a tachometer.

15. The device of claim 13, wherein the state of the gyroscopic means is determined by numerically differentiating the angular position of the body.

16. The device of claim 1, further including an active control system to provide device stability.

17. A spatially unrestricted force-feedback device, comprising:

a body;

an active control system to stabilize the body in space;

three rotatable reaction wheels coupled to the body;

means for determining the angular velocity of each wheel;

an angular position measuring device to determine the state of the body in the space;

a user-interactable member connected to the body; and force-feedback means using the angular velocity and position of the body as inputs to produce torque on the member about three arbitrary axes through the coordinated acceleration and deceleration of the angular velocity of each wheel.

18. The device of claim 17, wherein the angular position measuring device is an inertial measuring unit.

19. The device of claim 17, wherein the angular velocity measuring device uses numerical differentiation to determine the angular position of the body.

20. A method of generating a spatially unrestricted haptic environment, comprising the steps of:

providing a body in space having a user-interactable force-feedback device;

geo-stabilizing the body in one or more dimensions;

simulating a virtual environment modeling one or more virtual objects; and interfacing the user-interactable force-feedback device to the virtual environment, enabling the user to experience a force representative of an activity within the virtual environment involving one or more of the objects.

21. The method of claim 20, further including the step of:

slowly and continually removing angular momentum from the body so as to minimize the effect on a user.

22. The method of claim 20, further including the steps of:

receiving an input disturbance on the body;

stabilizing the body through a pole placement, with the location of the poles being determined through optimal control theory; and canceling out the disturbance inputs to produce a desired torque output immune to the input disturbance.

23. The method of claim 20, further including the step of:

receiving an external force generated through a remote physical device; and producing a scaled representation of the force received relative to a point on the physical device.

24. The method of claim 23, wherein the scaled representation is such that the maximum force applicable to the physical device is mapped into the maximum force which the device is capable of producing.

* * * * *